United States Patent
Gomi et al.

(10) Patent No.: US 9,481,088 B2
(45) Date of Patent: Nov. 1, 2016

(54) ROBOT CONTROL DEVICE, ROBOT, AND ROBOT SYSTEM

(71) Applicant: Seiko Epson Corporation, Tokyo (JP)

(72) Inventors: Akihiro Gomi, Fujimi (JP); Masaki Motoyoshi, Shiojiri (JP)

(73) Assignee: Seiko Epson Corporation (JP)

( * ) Notice: Subject to any disclaimer, the term of this patent is extended or adjusted under 35 U.S.C. 154(b) by 98 days.

(21) Appl. No.: 14/516,993

(22) Filed: Oct. 17, 2014

(65) Prior Publication Data
US 2015/0120050 A1  Apr. 30, 2015

(30) Foreign Application Priority Data
Oct. 30, 2013 (JP) .................. 2013-225387

(51) Int. Cl.
| | |
|---|---|
| *B25J 9/16* | (2006.01) |
| *B25J 9/00* | (2006.01) |
| *B25J 18/04* | (2006.01) |
| *B25J 5/00* | (2006.01) |
| *B25J 15/00* | (2006.01) |
| *B25J 13/08* | (2006.01) |

(52) U.S. Cl.
CPC ............ *B25J 9/1682* (2013.01); *B25J 9/0087* (2013.01); *B25J 9/162* (2013.01); *B25J 18/04* (2013.01); *B25J 5/007* (2013.01); *B25J 13/088* (2013.01); *B25J 15/0052* (2013.01); *G05B 2219/39109* (2013.01); *G05B 2219/43203* (2013.01); *Y10S 901/09* (2013.01)

(58) Field of Classification Search
CPC ...... B25J 13/088; B25J 5/007; B25J 9/1651; B25J 9/1682; B25J 9/162; B25J 15/0052; B25J 18/04; B25J 9/0087; G05B 2219/39195; G05B 2219/43203; G05B 2219/39109; Y10S 901/09
See application file for complete search history.

(56) References Cited

U.S. PATENT DOCUMENTS

| | | | | |
|---|---|---|---|---|
| 5,781,705 | A * | 7/1998 | Endo ............ | B25J 9/1643 318/568.22 |
| 7,415,321 | B2 * | 8/2008 | Okazaki ......... | B25J 9/1697 318/568.1 |
| 7,591,078 | B2 * | 9/2009 | Crampton ....... | B25J 13/088 33/503 |
| 7,765,023 | B2 | 7/2010 | Oaki et al. | |
| 8,204,626 | B2 | 6/2012 | Yoshiike et al. | |

(Continued)

FOREIGN PATENT DOCUMENTS

| | | |
|---|---|---|
| EP | 0402599 A1 | 12/1990 |
| JP | 02-284884 A | 11/1990 |

(Continued)

*Primary Examiner* — Jason Holloway
(74) *Attorney, Agent, or Firm* — Harness, Dickey & Pierce, P.L.C.

(57) ABSTRACT

A robot control device controls the operation of a robot including a trunk that is rotatable around an axis, first and second robot arms that are provided at the trunk and rotatable with respect to the trunk, and first, second, and third inertial sensors. In an operation in which the second robot arm is brought into a stationary state and the first robot arm is rotated around the axis from the stationary state and moved to a target position, the robot control device makes B/A<0.27 satisfied when a maximum value of the amplitude of the angular velocity of the trunk around the axis before the first robot arm reaches the target position is defined as A, and a maximum value of the amplitude of the angular velocity of the trunk around the axis after the first robot arm has reached the target position first is defined as B.

14 Claims, 15 Drawing Sheets

(56) References Cited

U.S. PATENT DOCUMENTS

| | | | |
|---|---|---|---|
| 2008/0161970 A1* | 7/2008 | Adachi | B25J 9/0003 700/253 |
| 2008/0235970 A1* | 10/2008 | Crampton | B25J 13/088 33/503 |
| 2009/0125145 A1* | 5/2009 | Adachi | B25J 9/0003 700/250 |
| 2011/0135437 A1* | 6/2011 | Takeshita | B25J 9/042 414/744.5 |
| 2012/0004774 A1* | 1/2012 | Umetsu | B25J 5/007 700/254 |
| 2013/0204437 A1* | 8/2013 | Koselka | A01D 46/30 700/259 |
| 2014/0060233 A1 | 3/2014 | Gomi et al. | |
| 2014/0067118 A1 | 3/2014 | Gomi et al. | |
| 2014/0067119 A1 | 3/2014 | Gomi et al. | |
| 2014/0067120 A1 | 3/2014 | Gomi et al. | |

FOREIGN PATENT DOCUMENTS

| | | |
|---|---|---|
| JP | 07-093010 A | 4/1995 |
| JP | 2005-242794 A | 9/2005 |
| JP | 2011-025339 A | 2/2011 |
| JP | 2013-099806 A | 5/2013 |
| JP | 2014-046401 A | 3/2014 |
| JP | 2014-046402 A | 3/2014 |
| JP | 2014-046403 A | 3/2014 |
| JP | 2014-046404 A | 3/2014 |

* cited by examiner

ROBOT CONTROL DEVICE, ROBOT, AND ROBOT SYSTEM

BACKGROUND

1. Technical Field

The present invention relates to a robot control device, a robot, and a robot system.

2. Related Art

Robots having a robot arm constituted by links of multiple joints are known. For example a hand or the like as an end effector is mounted on a tip portion of the robot arm. The robots are utilized for a number of apparatuses, such as assembling apparatuses.

In such robots, the robot arm vibrates when the robot arm is moved and stopped. While the robot arm is vibrating, the hand mounted on the tip portion of the robot arm also vibrates. Since it is difficult for the hand to perform the work of gripping a workpiece while the hand is vibrating, it is necessary to wait for the vibration of the hand to stop.

Thus, a method of shortening the time taken for the hand to vibrate in order to raise the productivity of a robot is disclosed in JP-A-2005-242794. Although the robot disclosed in JP-A-2005-242794 is a scalar robot having a base and a robot arm linked to the base, according to this, an angle sensor that detects the rotational angle of the robot arm is arranged at an actuator of the robot arm. Moreover, an angular velocity sensor that detects the vibration of the robot arm is arranged at the robot arm. A low-frequency component of the angle sensor is extracted using a low-pass filter, and a high-frequency component of the output of the angular velocity sensor is extracted using a high-pass filter. Next, the operation of the robot arm is detected by composing the output of the angle sensor and the output of the angular velocity sensor. The vibration of the robot arm is suppressed by controlling the robot arm in response to the operation of the robot arm.

The method described in JP-A-2005-242794 is a method that is effective as a method of attenuating the vibration of the robot arm linked to the base that stands still.

However, in double-arm robots having a base, a trunk rotatably linked to the base, and two robot arms rotatably linked to the trunk, not only the robot arms but also the trunk vibrate. Accordingly, the double-arm robots as mentioned above has a problem in that it is difficult to attenuate the vibration of the robot arm because the vibration of the trunk is transmitted to the robot arms even if the vibration of the robot arms is attenuated using the method described in JP-A-2005-242794.

SUMMARY

An advantage of some aspects of the invention is to provide a robot control device, a robot, and a robot system that can suppress the vibration of a first robot arm, a second robot arm, and a trunk.

The invention can be implemented as the following application examples.

Application Example 1

This application example is directed to a robot control device that controls the operation of a robot, including a trunk that is rotatable around an axis; a first robot arm and a second robot arm that are provided at the trunk and are rotatable with respect to the trunk; a first inertial sensor that is provided at the first robot arm; a second inertial sensor that is provided at the second robot arm; and a third inertial sensor that is provided at the trunk. In an operation in which the second robot arm is brought into a stationary state and the first robot arm is rotated around the axis from the stationary state and moved to a target position, the following Expression (1) is made to satisfy when a maximum value of the amplitude of the angular velocity of the trunk around the axis before the first robot arm reaches the target position is defined as A, and a maximum value of the amplitude of the angular velocity of the trunk around the axis after the first robot arm has reached the target position first is defined as B.

$$B/A < 0.27 \qquad (1)$$

According to this configuration, the vibration of the first robot arm, the second robot arm, and the trunk can be suppressed. By satisfying $B/A<0.27$, the stiffness of the trunk around the axis becomes equivalently high and the effect of suppressing the vibration of the first robot arm, the second robot arm, and the trunk can be enhanced.

Specifically, for example, the vibration of the trunk by the reactions of the operation of the robot arms can be suppressed, and the effect of suppressing the vibration can be enhanced. Accordingly, the vibration of three members including an operating robot arm, the trunk, and a robot arm opposite to the operating robot arm is also suppressed, and quick positioning is enabled.

Application Example 2

In the robot control device according to the application example described above, it is preferable that the first robot arm includes a first link that is provided at the trunk and is rotatable around a first rotational axis; a second link that is provided at the first link and is rotatable around a second rotational axis, which is a rotational axis orthogonal to the first rotational axis or a rotational axis parallel to an axis orthogonal to the first rotational axis; a third link that is provided at the second link and is rotatable around a third rotational axis, which is a rotational axis orthogonal to the second rotational axis or a rotational axis parallel to an axis orthogonal to the second rotational axis; and a fourth link that is provided at the third link and is rotatable around a fourth rotational axis, which is a rotational axis orthogonal to the third rotational axis or a rotational axis parallel to an axis orthogonal to the third rotational axis, and in the operation in which the first robot arm is moved from the stationary state to the target position, the angle formed between a central axis extending in a longitudinal direction of the third link of the first robot arm and a central axis extending in a longitudinal direction of the fourth link is preferably made to be 90°, and the third link of the first robot arm is rotated by 90°.

According to this configuration, the vibration of the first robot arm, the second robot arm, and the trunk can be more reliably suppressed.

Application Example 3

In the robot control device according to the application example described above, it is preferable that in an operation in which the first robot arm is brought into a stationary state and the second robot arm is rotated around the axis from the stationary state and moved to a target position, the following Expression (2) is made to satisfy when a maximum value of the amplitude of the angular velocity of the trunk around the axis before the second robot arm reaches the target position, is defined as C, and a maximum value of the amplitude of the angular velocity of the trunk around the axis after the second robot arm has reached the target position first is defined as D.

$$D/C<0.27 \qquad (2)$$

According to this configuration, the stiffness of the trunk around the axis becomes equivalently high and the effect of suppressing the vibration of the first robot arm, the second robot arm, and the trunk can be enhanced.

Application Example 4

In the robot control device according to the application example described above, it is preferable that the second robot arm includes a first link that is provided at the trunk and is rotatable around a first rotational axis; a second link that is provided at the first link and rotatable around a second rotational axis, which is a rotational axis orthogonal to the first rotational axis or a rotational axis parallel to an axis orthogonal to the first rotational axis; a third link that is provided at the second link and is rotatable around a third rotational axis, which is a rotational axis orthogonal to the second rotational axis or a rotational axis parallel to an axis orthogonal to the second rotational axis; and a fourth link that is provided at the third link and is rotatable around a fourth rotational axis, which is a rotational axis orthogonal to the third rotational axis or a rotational axis parallel to an axis orthogonal to the third rotational axis. In the operation in which the second robot arm is moved from the stationary state to the target position, the angle formed between a central axis extending in a longitudinal direction of the third link of the second robot arm and a central axis extending in a longitudinal direction of the fourth link is preferably made to be 90°, and the third link of the second robot arm is rotated by 90°.

According to this configuration, the vibration of the first robot arm, the second robot arm, and the trunk can be more reliably suppressed.

Application Example 5

It is preferable that the robot control device according to the application example described above further includes a controller that controls the actuation of the trunk, the first robot arm, and the second robot arm while suppressing the vibration thereof on the basis of detection results of the first inertial sensor, the second inertial sensor, and the third inertial sensor.

According to this configuration, the vibration of the first robot arm, the second robot arm, and the trunk can be more reliably suppressed.

Application Example 6

In the robot control device according to the application example described above, it is preferable that the controller obtains a first correction component on the basis of the detection results of the first inertial sensor and the third inertial sensor, and feeds back the first correction component to suppress the vibration of the first robot arm, obtains a second correction component on the basis of the detection results of the second inertial sensor and the third inertial sensor and feeds back the second correction component to suppress the vibration of the second robot arm, and obtains a third correction component on the basis of the detection result of the third inertial sensor and feeds back the third correction component to suppress the vibration of the trunk, and a feedback gain of the third correction component is greater than a feedback gain of the first correction component.

According to this configuration, the stiffness of the trunk around the axis becomes equivalently high and the effect of suppressing the vibration of the first robot arm, the second robot arm, and the trunk can be enhanced.

Application Example 7

In the robot control device according to the application example described above, it is preferable that the feedback gain of the third correction component is greater than the feedback gain of the second correction component.

According to this configuration, the stiffness of the trunk around the axis becomes equivalently high and the effect of suppressing the vibration of the first robot arm, the second robot arm, and the trunk can be enhanced.

Application Example 8

In the robot control device according to the application example described above, it is preferable that the controller adjusts the feedback gain of the third correction component in accordance with the posture of at least one of the first robot arm and the second robot arm.

According to this configuration, the effect of suppressing the vibration of the first robot arm, the second robot arm, and the trunk can be enhanced.

Application Example 9

In the robot control device according to the application example described above, it is preferable that when the posture of the robot is a first posture and when the posture of the robot is a second posture in which the moment of inertia of the robot around the axis is greater than that of the first posture, the controller makes the feedback gain of the third correction component in the second posture greater than that in the first posture.

According to this configuration, the effect of suppressing the vibration of the first robot arm, the second robot arm, and the trunk can be enhanced.

Application Example 10

In the robot control device according to the application example described above, it is preferable that the angular velocity of the trunk around the axis is obtained on the basis of the detection result of the third inertial sensor.

According to this configuration, the angular velocity can be easily and reliably obtained without preparing a separate inertial sensor.

Application Example 11

This application example is directed to a robot including a trunk that is rotatable around an axis; a first robot arm and a second robot arm that are provided at the trunk and are rotatable with respect to the trunk; a first inertial sensor that is provided at the first robot arm; a second inertial sensor that is provided at the second robot arm; and a third inertial sensor that is provided at the trunk. In an operation in which the second robot arm is brought into a stationary state and the first robot arm is rotated around the axis from the stationary state and moved to a target position, the following Expression (1) is satisfied when a maximum value of the amplitude of the angular velocity of the trunk around the axis before the first robot arm reaches the target position is defined as A, and a maximum value of the amplitude of the angular velocity of the trunk around the axis after the first robot arm has reached the target position first is defined as B.

$$B/A<0.27 \quad (1)$$

According to this configuration, the vibration of the first robot arm, the second robot arm, and the trunk can be suppressed. By satisfying B/A<0.27, the stiffness of the trunk around the axis becomes equivalently high and the effect of suppressing the vibration of the first robot arm, the second robot arm, and the trunk can be enhanced.

Specifically, for example, the vibration of the trunk by the reactions of the operation of the robot arms can be suppressed, and the effect of suppressing the vibration can be enhanced. Accordingly, the vibration of three members including an operating robot arm, the trunk, and a robot arm opposite to the operating robot arm is also suppressed, and quick positioning is enabled.

Application Example 12

In the robot according to the application example described above, it is preferable that in an operation in which the first robot arm is brought into a stationary state and the second robot arm is rotated around the axis from the stationary state and moved to a target position, the following Expression (2) is satisfied when a maximum value of the amplitude of the angular velocity of the trunk around the axis before the second robot arm reaches the target position, is defined as C, and a maximum value of the amplitude of the angular velocity of the trunk around the axis after the second robot arm has reached the target position first is defined as D.

$$D/C<0.27 \quad (2)$$

According to this configuration, the stiffness of the trunk around the axis becomes equivalently high and the effect of suppressing the vibration of the first robot arm, the second robot arm, and the trunk can be enhanced.

Application Example 13

This application example is directed to a robot system including a robot having a trunk that is rotatable around an axis; a first robot arm and a second robot arm that are provided at the trunk and are rotatable with respect to the trunk; a first inertial sensor that is provided at the first robot arm; a second inertial sensor that is provided at the second robot arm; and a third inertial sensor that is provided at the trunk, and a robot control device that controls the operation of the robot. In an operation in which the second robot arm is brought into a stationary state and the first robot arm is rotated around the axis from the stationary state and moved to a target position, the following Expression (1) is satisfied when a maximum value of the amplitude of the angular velocity of the trunk around the axis before the first robot arm reaches the target position is defined as A, and a maximum value of the amplitude of the angular velocity of the trunk around the axis after the first robot arm has reached the target position first is defined as B.

$$B/A<0.27 \quad (1)$$

According to this configuration, the vibration of the first robot arm, the second robot arm, and the trunk can be suppressed. By satisfying B/A<0.27, the stiffness of the trunk around the axis becomes equivalently high and the effect of suppressing the vibration of the first robot arm, the second robot arm, and the trunk can be enhanced.

Specifically, for example, the vibration of the trunk by the reactions of the operation of the robot arms can be suppressed, and the effect of suppressing the vibration can be enhanced. Accordingly, the vibration of three members including an operating robot arm, the trunk, and a robot arm opposite to the operating robot arm is also suppressed, and quick positioning is enabled.

Application Example 14

In the robot system according to the application example described above, it is preferable that in an operation in which the first robot arm is brought into a stationary state and the second robot arm is rotated around the axis from the stationary state and moved to a target position, the following Expression (2) is satisfied when a maximum value of the amplitude of the angular velocity of the trunk around the axis before the second robot arm reaches the target position, is defined as C, and a maximum value of the amplitude of the angular velocity of the trunk around the axis after the second robot arm has reached the target position first is defined as D.

$$C/D<0.27 \quad (2)$$

According to this configuration, the stiffness of the trunk around the axis becomes equivalently high and the effect of suppressing the vibration of the first robot arm, the second robot arm, and the trunk can be enhanced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot control device, a robot, and a robot system according to the invention will be described in detail with reference to preferred embodiments illustrated in the accompanying drawings.

Figure 1:
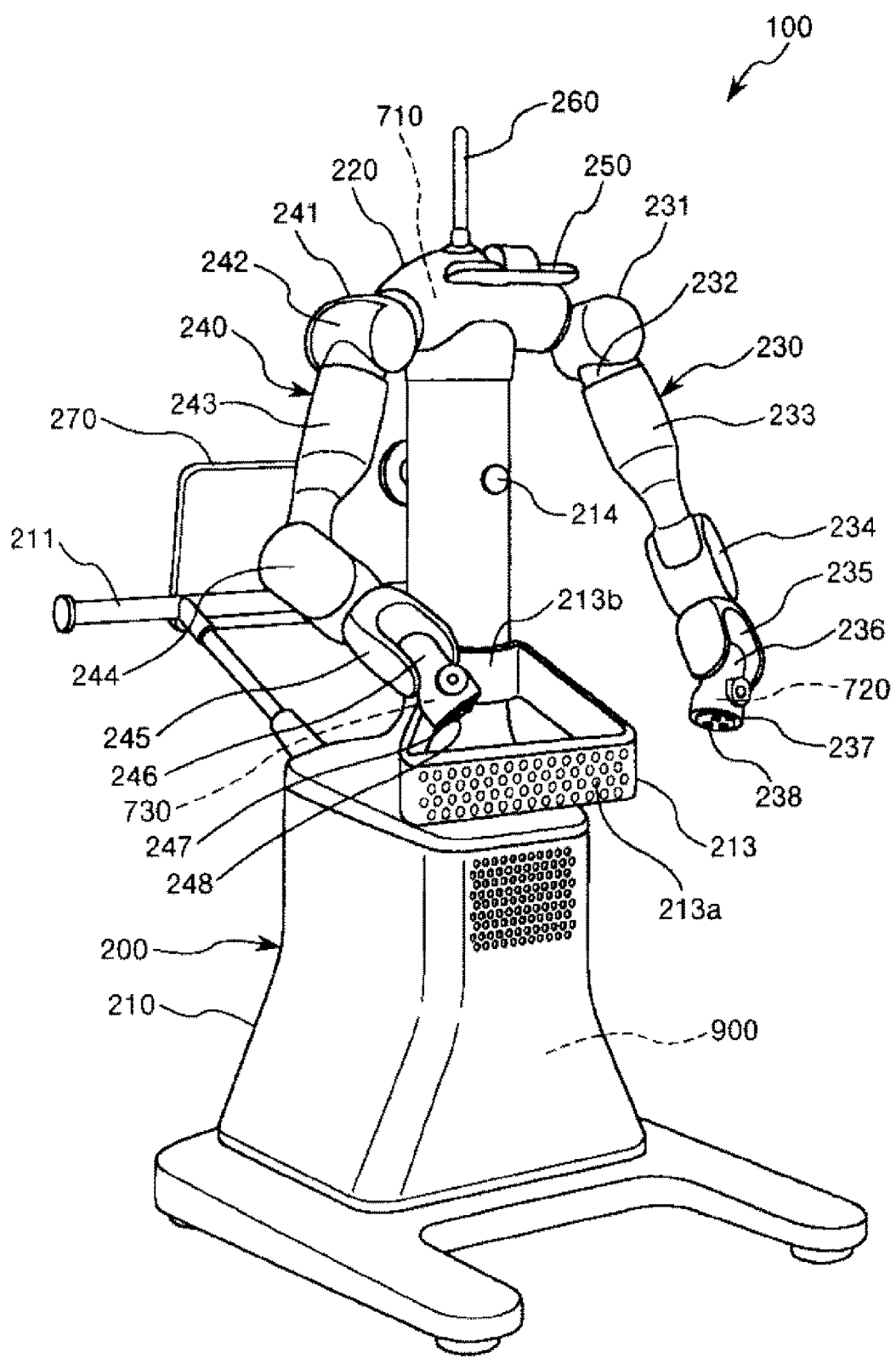
FIG. 1 is a perspective view illustrating an embodiment of a robot system according to the invention.
Figure 2:
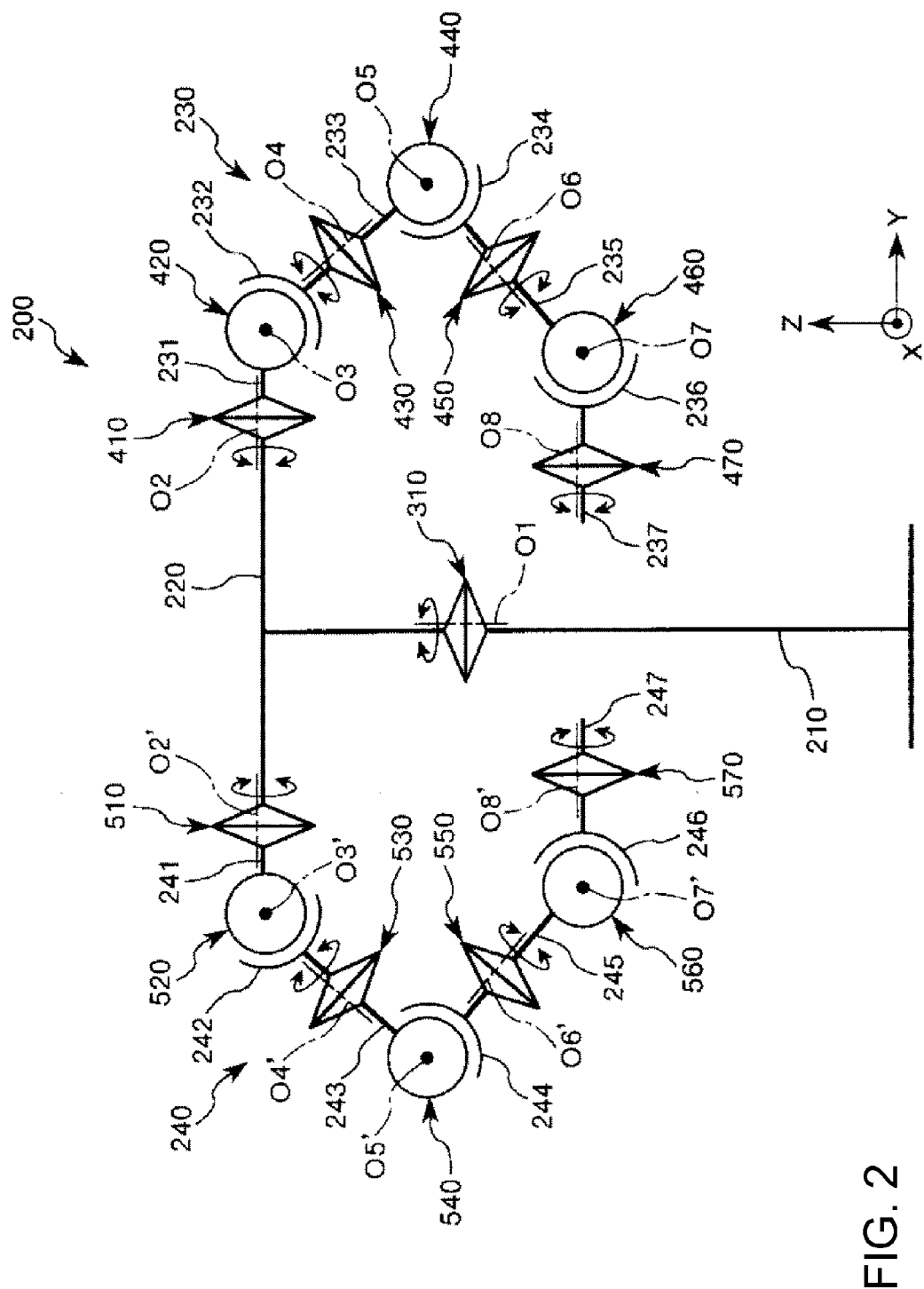
FIG. 2 is a schematic view showing rotational axes of the robot of the robot system illustrated in FIG. 1.
Figure 3:
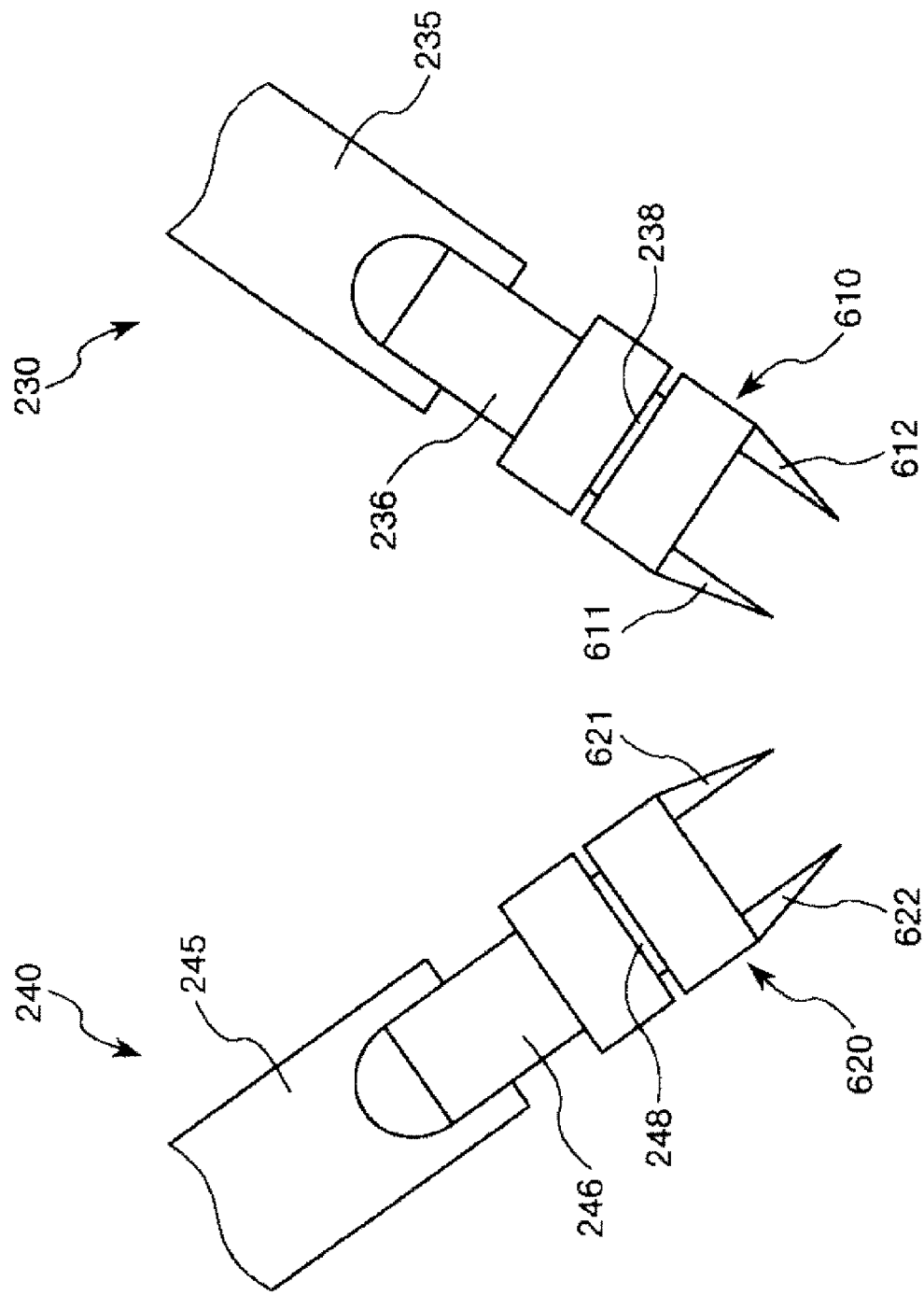
FIG. 3 is a view illustrating the positions of end effectors to be mounted on the robot of the robot system illustrated in FIG. 1.
Figure 4:
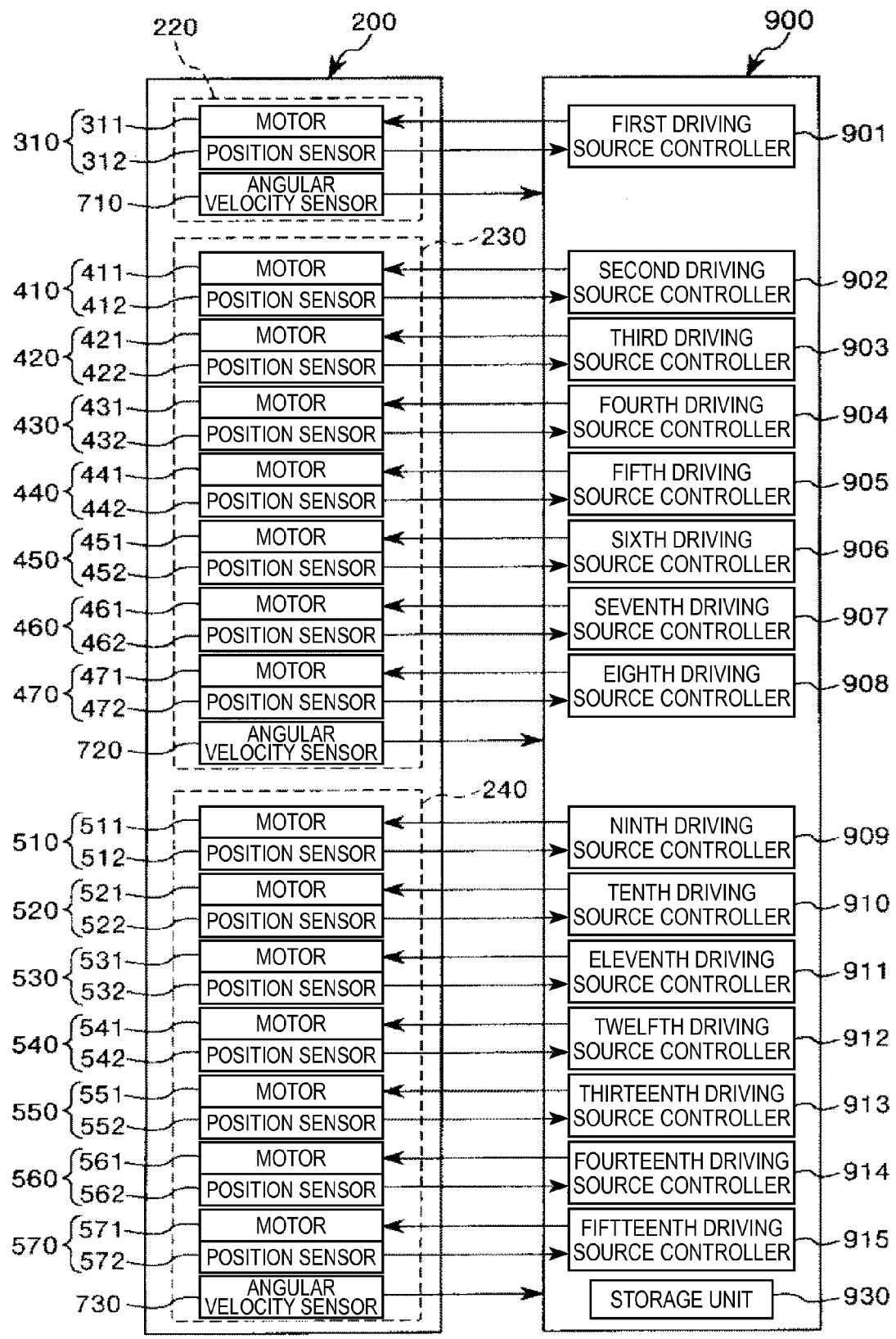
FIG. 4 is a block diagram illustrating a control system of the robot of the robot system illustrated in FIG. 1.
Figure 5:
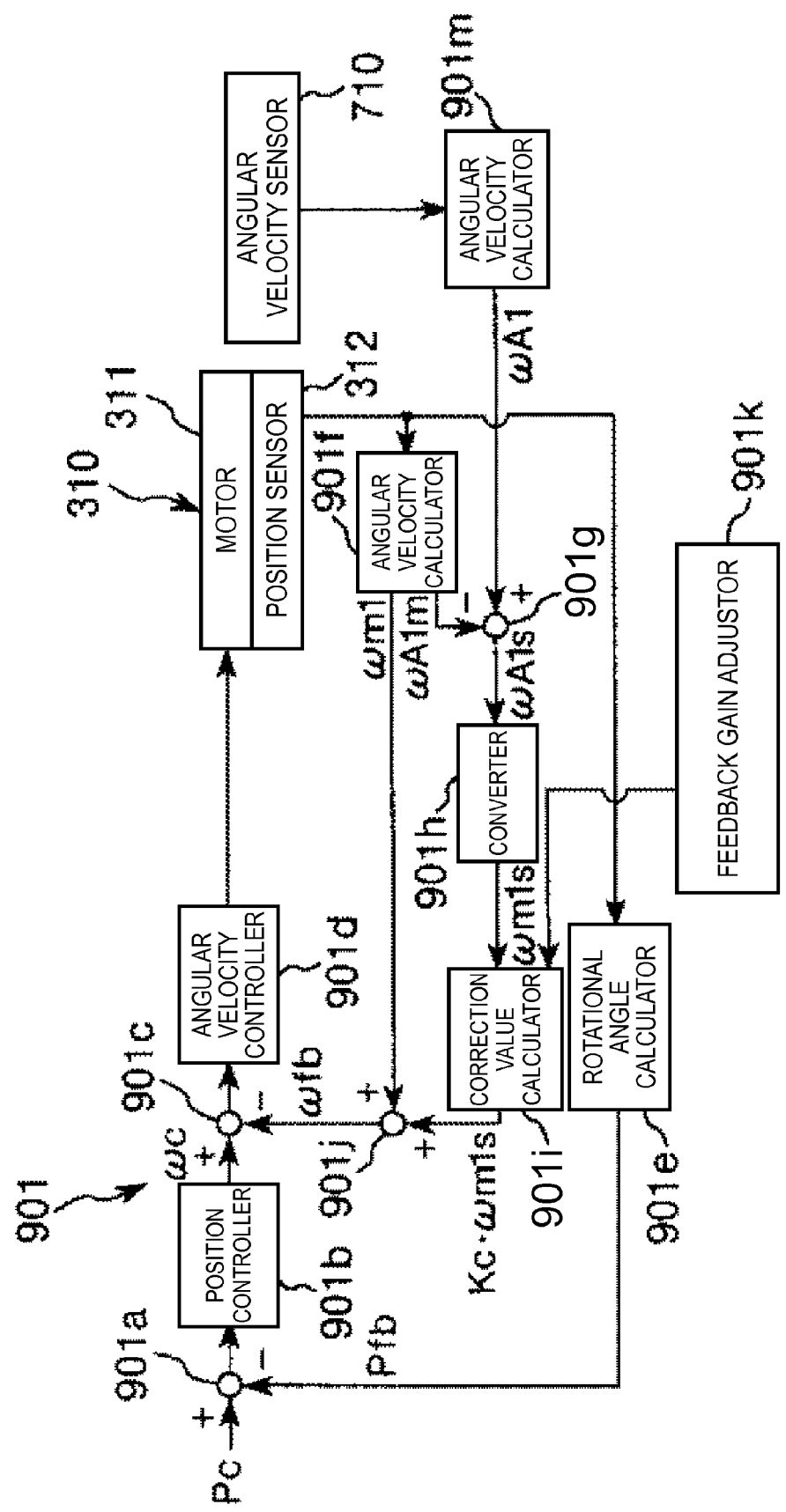
FIG. 5 is a block diagram illustrating the drive control of the robot of the robot system illustrated in FIG. 1.
Figure 6:
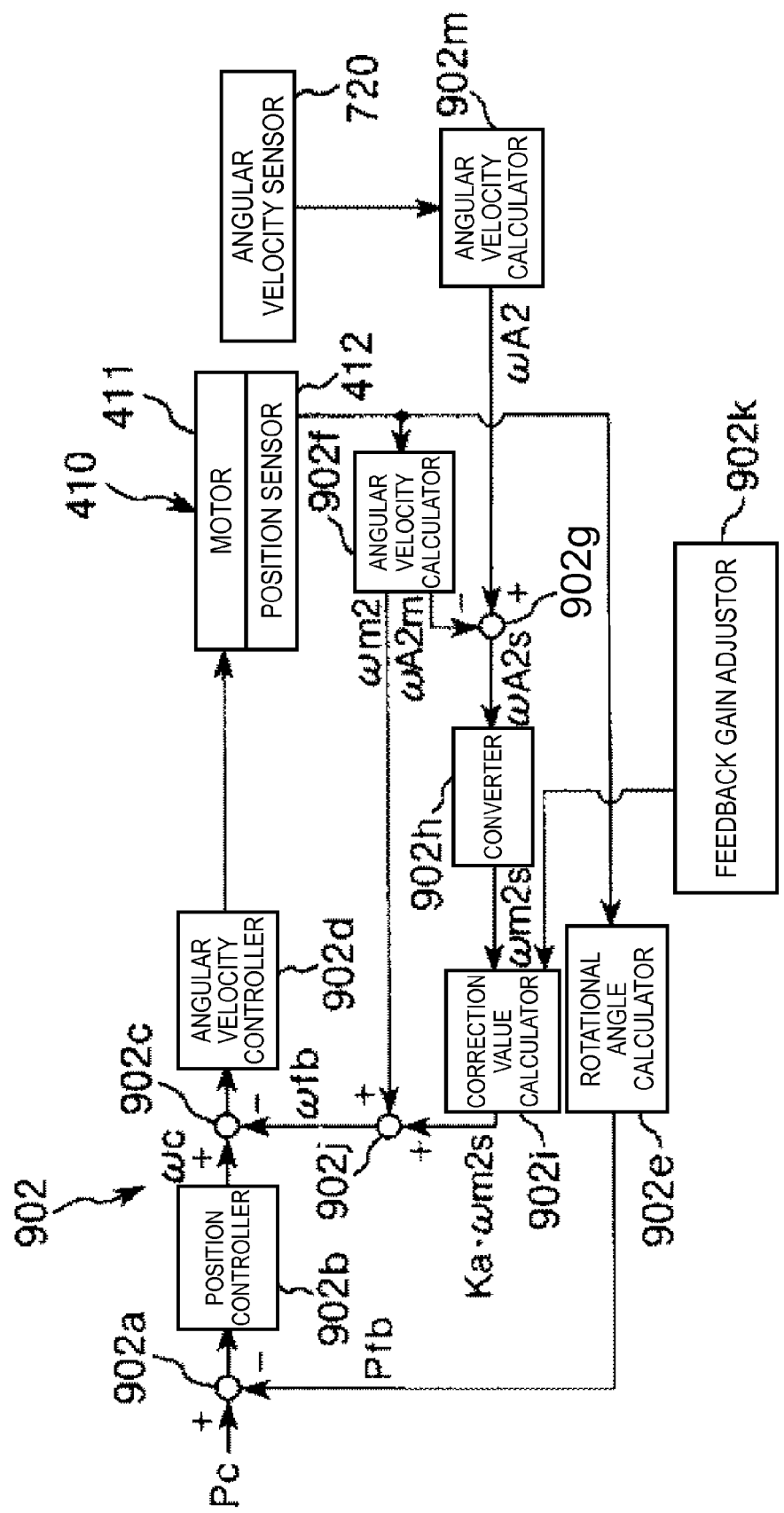
FIG. 6 is a block diagram illustrating the drive control of the robot of the robot system illustrated in FIG. 1.
Figure 7:
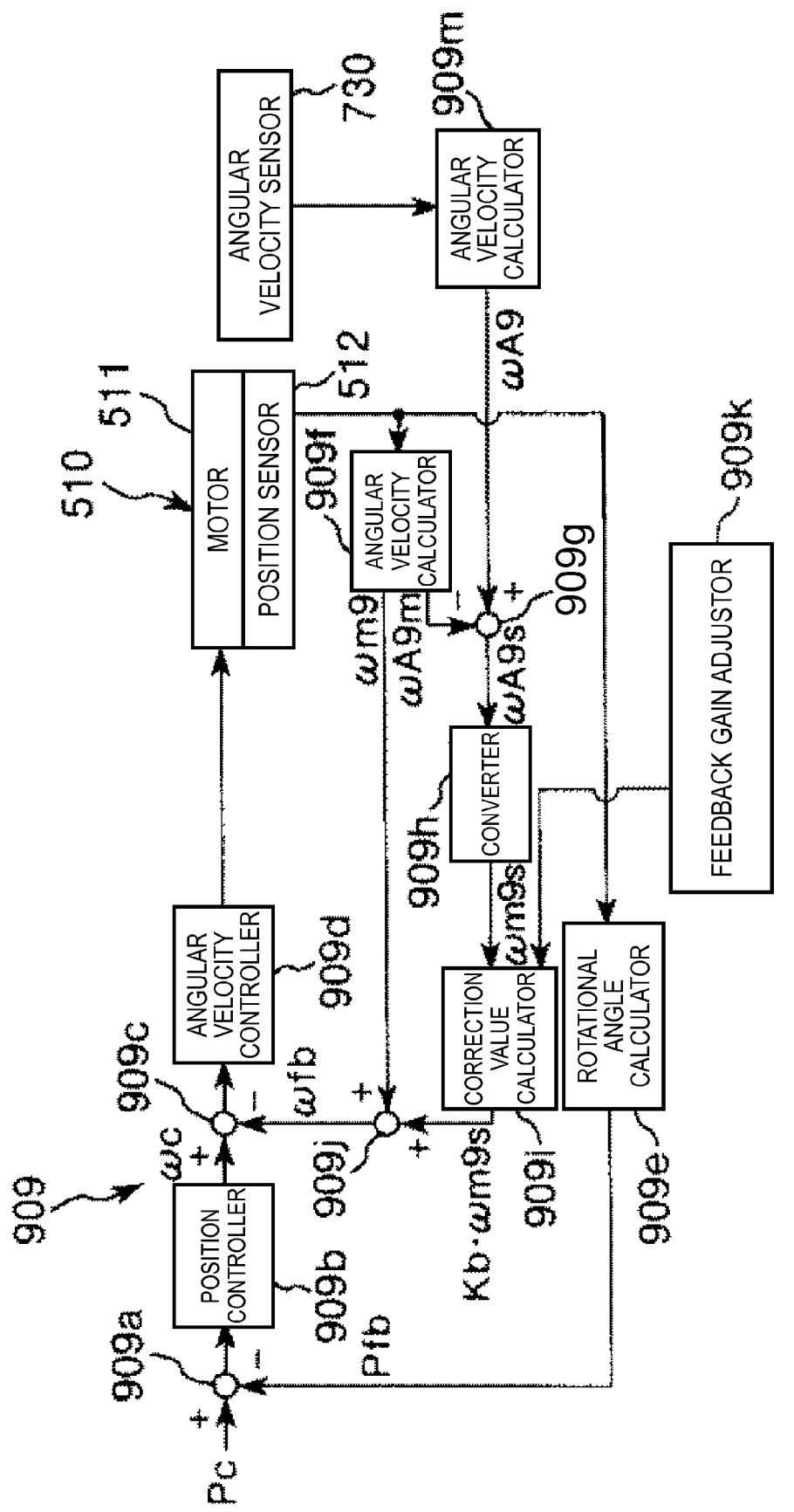
FIG. 7 is a block diagram illustrating the drive control of the robot of the robot system illustrated in FIG. 1.
Figure 8:
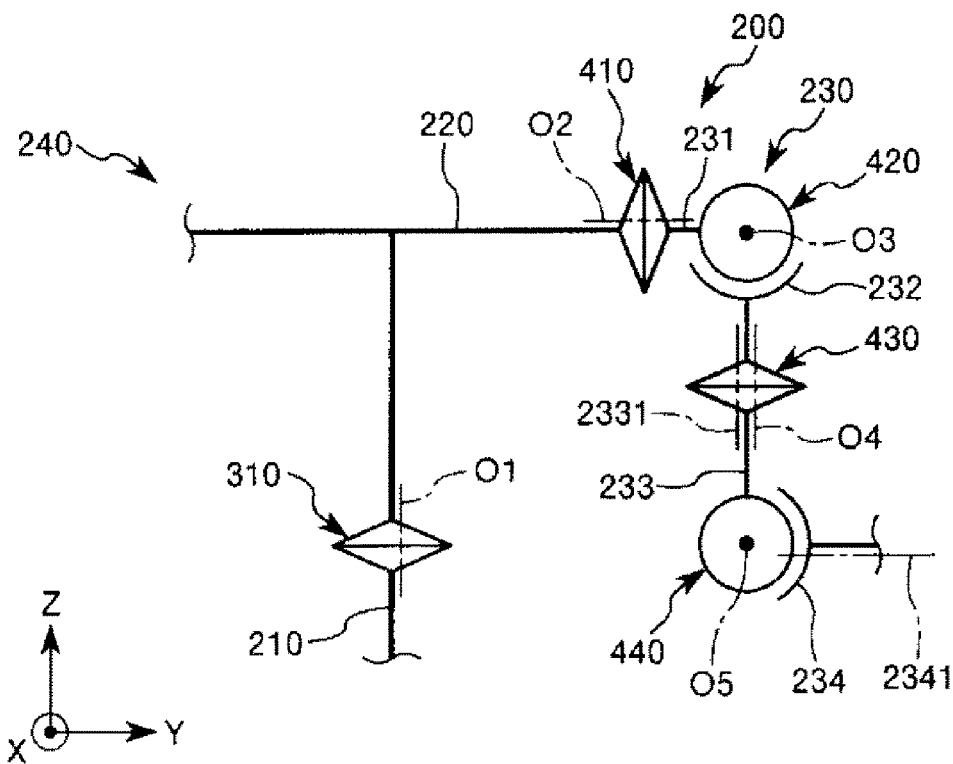
FIG. 8 is a view for explaining the measurement conditions of the angular velocity of the robot of the robot system illustrated in FIG. 1.
Figure 9:
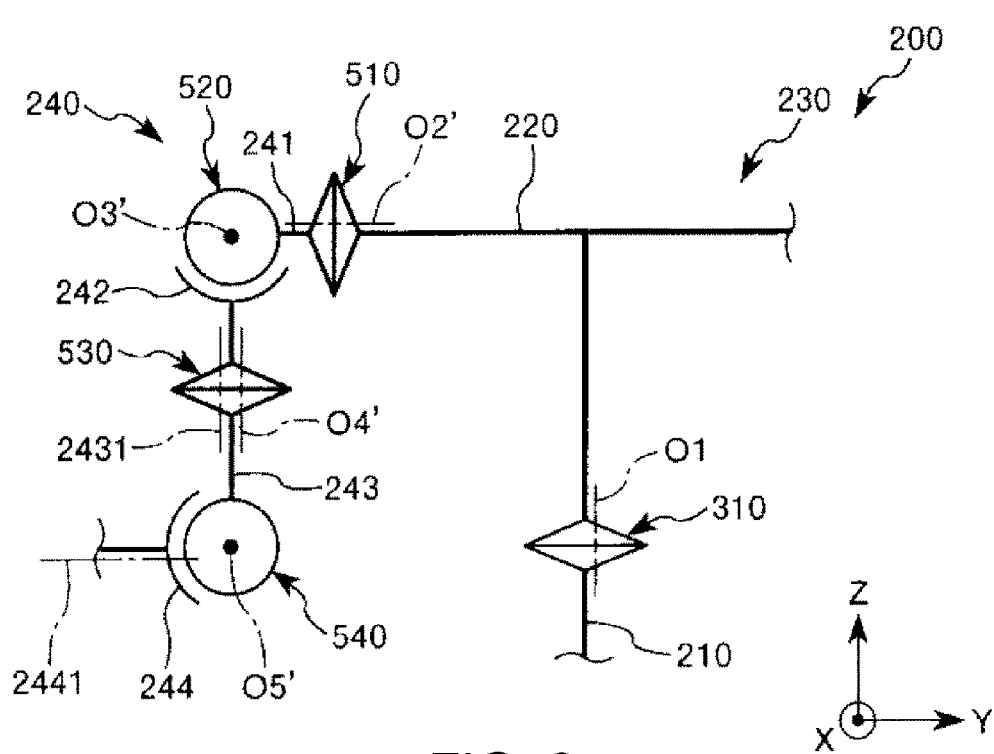
FIG. 9 is a view for explaining the measurement conditions of the angular velocity of the robot of the robot system illustrated in FIG. 1.
Figure 10:
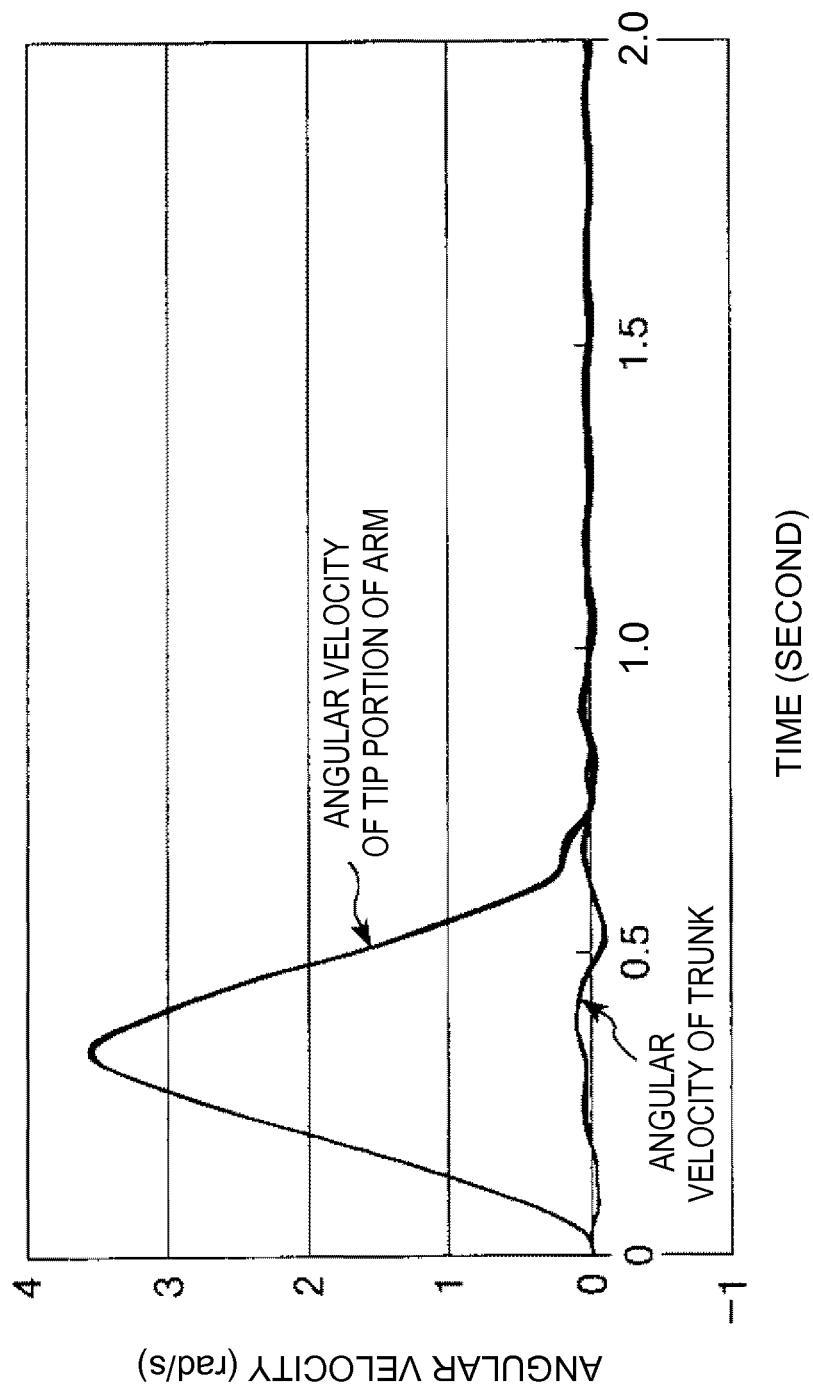
FIG. 10 is a graph illustrating the angular velocity of a tip portion of a robot arm and the angular velocity of a trunk in the robot of the robot system illustrated in FIG. 1.
Figure 11:
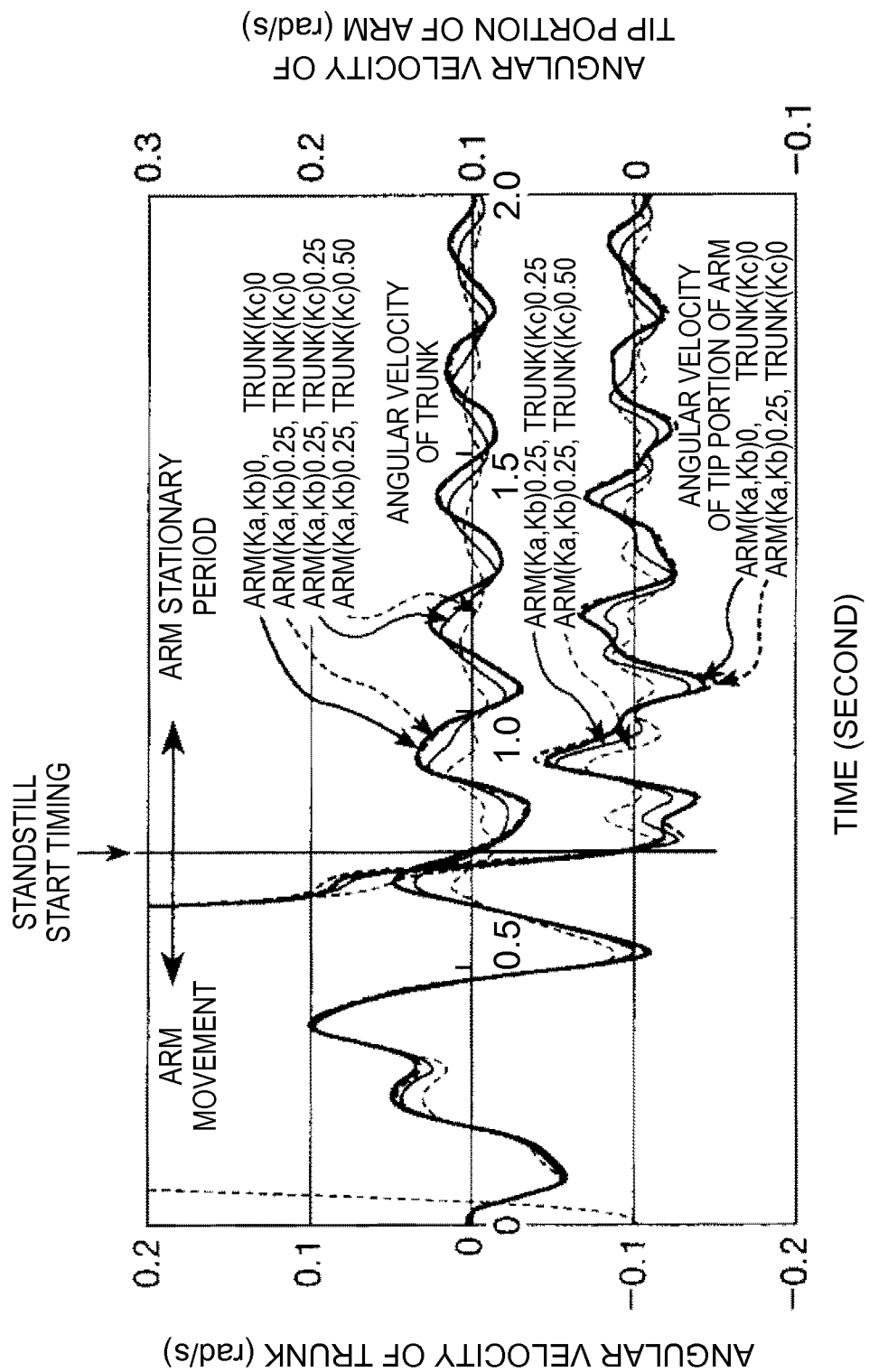
FIG. 11 is a graph illustrating the angular velocity of the tip portion of the robot arm and the angular velocity of the trunk in the robot of the robot system illustrated in FIG. 1.
Figure 12:
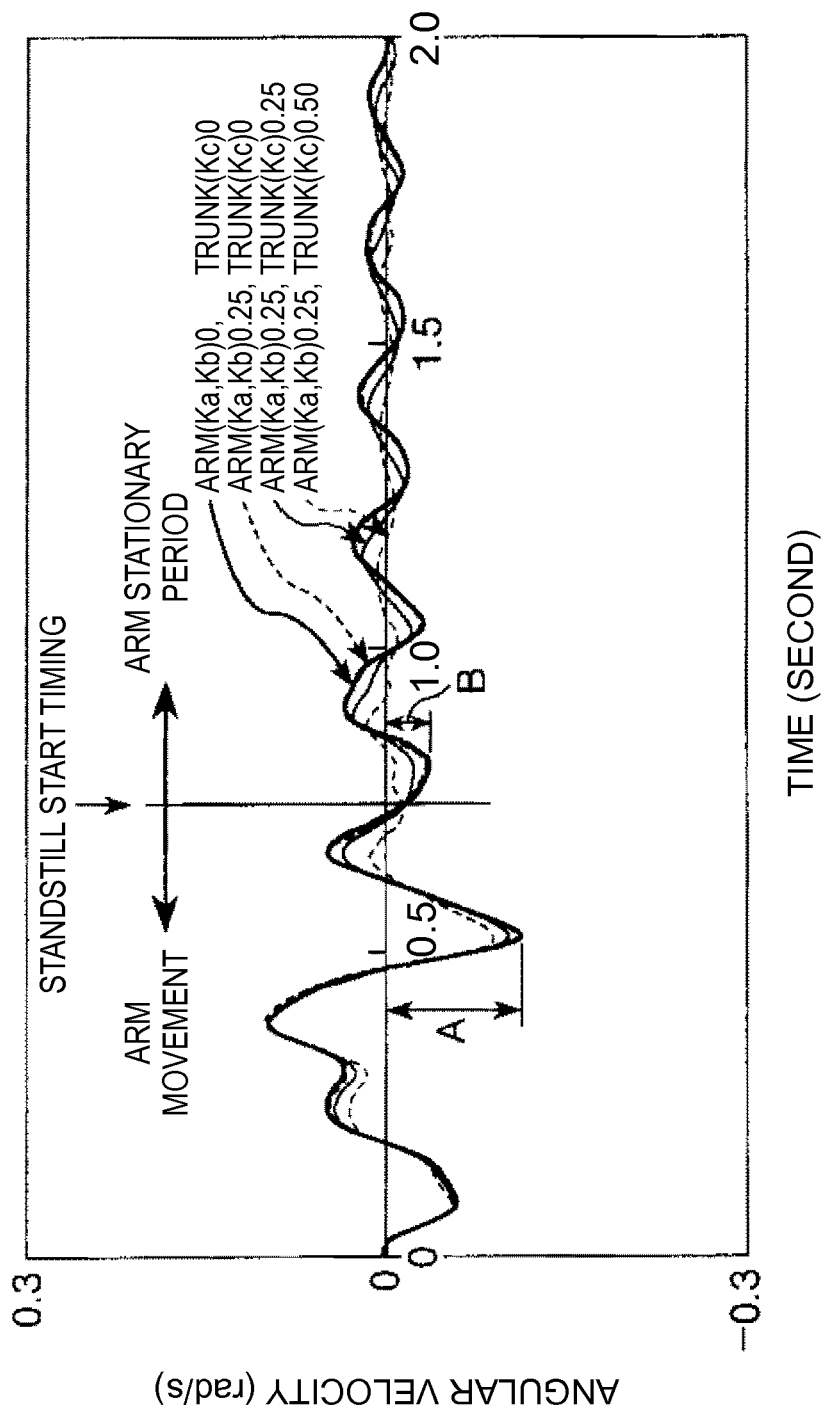
FIG. 12 is a graph illustrating the angular velocity of the trunk of the robot of the robot system illustrated in FIG. 1.

FIG. 1 is a perspective view illustrating an embodiment of the robot system according to the invention. FIG. 2 is a schematic view showing rotational axes of the robot of the robot system illustrated in FIG. 1. FIG. 3 is a view illustrating the positions of end effectors to be mounted on the robot of the robot system illustrated in FIG. 1. FIG. 4 is a block diagram illustrating a control system of the robot of the robot system illustrated in FIG. 1. FIGS. 5 to 7 are block diagrams illustrating the drive control of the robot of the robot system illustrated in FIG. 1, respectively. FIGS. 8 and 9 are respectively views for explaining the measurement conditions of the angular velocity of the robot of the robot system illustrated in FIG. 1. FIG. 10, FIG. 11, and FIGS. 13 to 16 are respectively graphs illustrating the angular velocity of a tip portion of a robot arm and the angular velocity of a trunk in the robot of the robot system illustrated in FIG. 1. FIG. 12 is a graph illustrating the angular velocity of the trunk of the robot of the robot system illustrated in FIG. 1.

In addition, in the following, for convenience of description, the upper side in FIG. 1 is referred to as "upper" and "upside" and the lower side is referred to as "lower" and "downside". Additionally, a trunk side of the robot arm in FIGS. 1 and 2 is referred to as a "base end", and a side opposite to the trunk side is referred to as a "tip".

Additionally, as illustrated in FIG. 3, an X-axis, a Y-axis, and a Z-axis that are orthogonal to each other are assumed. In this case, the Z-axis and a rotational axis O1 to be described below are made parallel to each other.

A robot system 100 illustrated in FIG. 1 can be used for, for example, a manufacturing process that manufactures precision instruments, such as a wrist watch, and has a robot 200, and a robot control device (controller) 900 that controls the actuation of the robot 200. The robot 200 and the robot control device 900 are electrically connected. In addition, the robot 200 and the robot control device 900 may be integral or may be separate. Hereinafter, the robot 200 and the robot control device 900 will be described in order.

Robot

As illustrated in FIG. 1, the robot 200 is a double arm robot, and has a base 210, a trunk 220 linked to (provided at) the base 210, a pair of a robot arm (first robot arm) 230 and a robot arm (second robot arm) 240 linked to a left and right of the trunk 220, a stereoscopic camera 250 provided at the trunk 220, hand cameras (not illustrated) provided at the respective robot arms 230 and 240, a signal lamp 260 provided at the trunk 220, and a monitor 270 provided on a back side of the trunk 220.

According to such a robot system 100, work can be performed while confirming the positions of a part, a tool, and the like on a work bench, using a stereoscopic camera 250 or the hand cameras. Additionally, the states (a drive state, a normal stop state, an abnormal stop state, and the like) of the robot system 100 can be easily confirmed by the signal lamp 260. Additionally, since information on the robot system 100 is displayed on the monitor 270, the states of the robot system 100 can be easily confirmed. The monitor 270 is, for example, a touch panel, and this touch panel is operated, so that a display screen can be switched, a command can be given to the robot system 100, or the given command can be changed.

Base

The base 210 is provided with a plurality of wheels (rotating members) that facilitates movement of the robot system 100, locking mechanisms (not illustrated) that locks the respective wheels, and a handle (gripping portion) 211 to be gripped when the robot system 100 is moved. The robot system 100 can be freely moved by releasing the locking mechanisms and by gripping and pushing or pulling the handle 211, and the robot system 100 can be fixed by locking the wheels at predetermined positions using the locking mechanisms. In this way, the convenience of the robot system 100 is improved by facilitating the movement of the robot system 100. In addition, the wheels, the locking mechanisms, and the handle 211 may be omitted, respectively.

Additionally, the base 210 is provided with a bumper 213 for abutting against the work bench (not illustrated). By making the bumper 213 abut against a side surface of the work bench, the robot system 100 can be opposed to the work bench with a predetermined gap. Therefore, an unintended contact between the robot system 100 and the work bench can be prevented. In addition, the bumper 213 has an abutment portion 213a that abuts against the work bench, and a fixed portion 213b fixed to the base 210. In FIG. 1, the abutment portion 213a is mounted on the base 210 so as to be located below the fixed portion 213b. The bumper 213 can be attached to and detached from the base 210, and the orientation of the bumper 213 can be vertically flipped. That is, on the contrary to FIG. 1, the bumper 213 can also be mounted on the base 210 so that the abutment portion 213a is located above the fixed portion 213b. In production sites, since a work bench with a height of about 700 mm and about 1000 mm is generally used, it is possible to change the height of the abutment portion 213a to cope with any work bench having different heights.

Additionally, the base 210 is provided with an emergency stop button 214, and the robot system 100 can be emergency-stopped by pushing the emergency stop button 214 in the case of an emergency.

Trunk

As illustrated in FIG. 2, the trunk 220 is linked to the base 210 via a joint mechanism 310 so as to be rotatable around the rotational axis (axis) O1. Additionally, as mentioned above, the trunk 220 is provided with the stereoscopic camera 250 and the signal lamp 260.

The configuration of the joint mechanism 310 is not particularly limited if the trunk 220 can be rotated around the rotational axis O1 with respect to the base 210. However, as illustrated in FIG. 4, there is adopted a configuration having a motor 311 as a driving source, a reduction gear (not illustrated) that reduces the rotating speed of the motor 311, and a position sensor 312 that detects the rotational angle of the motor 311. As the motor 311, for example, a servo motor, such as an AC servo motor or a DC servo motor, can be adopted. As the reduction gear, for example, a planetary gear type reduction gear, a harmonic drive ("the harmonic drive" is a registered trademark), or the like can be used. As the position sensor 312, for example, an encoder, a rotary encoder, a resolver, a potentiometer, or the like can be used.

Robot Arm

As illustrated in FIGS. 1 and 2, the robot arm 230 has a first shoulder portion (first link) 231 linked to the trunk 220 via a joint mechanism 410, a second shoulder portion (second link) 232 linked to the first shoulder portion 231 via a joint mechanism 420, an upper arm portion (third link) 233 linked to a tip of the second shoulder portion 232 via a twisting mechanism 430, a first forearm portion (fourth link) 234 linked to a tip of the upper arm portion 233 via a joint mechanism 440, a second forearm portion (fifth link) 235 linked to a tip of the first forearm portion 234 via a twisting mechanism 450, a wrist portion (sixth link) 236 linked to a tip of the second forearm portion 235 via a joint mechanism 460, and a linking portion (seventh link) 237 linked to a tip of the wrist portion 236 via a twisting mechanism 470. In the present embodiment, the upper arm portion 233, the first forearm portion 234, and the second forearm portion 235 form a longitudinal shape. Additionally, the linking portion 237 is provided with a hand portion 238, and as illustrated in FIG. 3, an end effector 610 according to the work that the robot system 100 is made to execute is mounted on the hand portion 238. In addition, a force sensor may be provided between the hand portion 238 and the end effector 610. By forming the force sensor, for example, force control, such as impedance control, can be performed.

Additionally, as illustrated in FIG. 2, the joint mechanism 410 rotates the first shoulder portion 231 around a rotational axis (first rotational axis) O2 orthogonal to the rotational axis O1 with respect to the trunk 220, the joint mechanism 420 rotates the second shoulder portion 232 around a rotational axis (second rotational axis) O3 orthogonal to the rotational axis O2 with respect to the first shoulder portion 231, the twisting mechanism 430 rotates (twists) the upper arm portion 233 around a rotational axis (third rotational axis) O4 orthogonal to the rotational axis O3 with respect to the second shoulder portion 232, the joint mechanism 440 rotates the first forearm portion 234 around a rotational axis (fourth rotational axis) O5 orthogonal to the rotational axis O4 with respect to the upper arm portion 233, the twisting mechanism 450 rotates (twists) the second forearm portion 235 around a rotational axis (fifth rotational axis) O6 orthogonal to the rotational axis O5 with respect to the first forearm portion 234, the joint mechanism 460 rotates the wrist portion 236 around a rotational axis (sixth rotational axis) O7 orthogonal to the rotational axis O6 with respect to the second forearm portion 235, and the twisting mechanism 470 rotates (twists) the linking portion 237 around a rotational axis (seventh rotational axis) O8 orthogonal to the rotational axis O7 with respect to the wrist portion 236. According to such a robot arm 230, bending and stretching of joints (a shoulder, an elbow, a wrist) and twisting of an upper arm and a forearm can be realized, similar to a human arm, by virtue of the relatively simple configuration.

In addition, the rotational axis O2 may be parallel to an axis orthogonal to the rotational axis O1, the rotational axis O3 may be parallel to an axis orthogonal to the rotational axis O2, the rotational axis O4 may be parallel to an axis orthogonal to the rotational axis O3, the rotational axis O5 may be parallel to an axis orthogonal to the rotational axis O4, the rotational axis O6 may be parallel to an axis orthogonal to the rotational axis O5, the rotational axis O7 may be parallel to an axis orthogonal to the rotational axis O6, and the rotational axis O8 may be parallel to an axis orthogonal to the rotational axis O7.

Although the configurations of the joint mechanism 410, the joint mechanism 420, the twisting mechanism 430, the joint mechanism 440, the twisting mechanism 450, the joint mechanism 460, and the twisting mechanism 470 are not particularly limited, respectively, these configurations are the same as the configuration of the aforementioned joint mechanism 310 in the present embodiment. That is, as illustrated in FIG. 4, the joint mechanism 410 has a motor 411 as a driving source, a reduction gear (not illustrated) that reduces the rotating speed of the motor 411, and a position sensor 412 that detects the rotational angle of the motor 411. Additionally, the joint mechanism 420 has a motor 421 as a driving source, a reduction gear (not illustrated) that reduces the rotating speed of the motor 421, and a position sensor 422 that detects the rotational angle of the motor 421. Additionally, the twisting mechanism 430 has a motor 431 as a driving source, a reduction gear (not illustrated) that reduces the rotating speed of the motor 431, and a position sensor 432 that detects the rotational angle of the motor 431. Additionally, the joint mechanism 440 has a motor 441 as a driving source, a reduction gear (not illustrated) that reduces the rotating speed of the motor 441, and a position sensor 442 that detects the rotational angle of the motor 441. Additionally, the twisting mechanism 450 has a motor 451 as a driving source, a reduction gear (not illustrated) that reduces the rotating speed of the motor 451, and a position sensor 452 that detects the rotational angle of the motor 451. Additionally, the joint mechanism 460 has a motor 461 as a driving source, a reduction gear (not illustrated) that reduces the rotating speed of the motor 461, and a position sensor 462 that detects the rotational angle of the motor 461. Additionally, the twisting mechanism 470 has a motor 471 as a driving source, a reduction gear (not illustrated) that reduces the rotating speed of the motor 471, and a position sensor 472 that detects the rotational angle of the motor 471. In addition, the respective reduction gears may be omitted, respectively.

The robot arm 240 has the same configuration as the robot arm 230. Namely, as illustrated in FIGS. 1 and 2, the robot arm 240 has a first shoulder portion (first link) 241 linked to the trunk 220 via a joint mechanism 510, a second shoulder portion (second link) 242 linked to the first shoulder portion 241 via a joint mechanism 520, an upper arm portion (third link) 243 linked to a tip of the second shoulder portion 242 via a twisting mechanism 530, a first forearm portion (fourth link) 244 linked to a tip of the upper arm portion 243 via a joint mechanism 540, a second forearm portion (fifth link) 245 linked to a tip of the first forearm portion 244 via a twisting mechanism 550, a wrist portion (sixth link) 246 linked to a tip of the second forearm portion 245 via a joint mechanism 560, and a linking portion 247 (seventh link) linked to a tip of the wrist portion 246 via a twisting mechanism 570. In the present embodiment, the upper arm portion 243, the first forearm portion 244, and the second forearm portion 245 form a longitudinal shape. Additionally, the linking portion 247 is provided with a hand portion 248, and an end effector 620 according to the work that the robot system 100 is made to execute is mounted on the hand portion 248. In addition, a force sensor may be provided between the hand portion 248 and the end effector 620. By forming the force sensor, for example, force control, such as impedance control, can be performed.

Additionally, as illustrated in FIG. 2, the joint mechanism 510 rotates the first shoulder portion 241 around a rotational axis (first rotational axis) O2' orthogonal to the rotational axis O1 with respect to the trunk 220, the joint mechanism 520 rotates the second shoulder portion 242 around a rotational axis (second rotational axis) O3' orthogonal to the rotational axis O2' with respect to the first shoulder portion 241, the twisting mechanism 530 rotates (twists) the upper arm portion 243 around a rotational axis (third rotational axis) O4' orthogonal to the rotational axis O3' with respect to the second shoulder portion 242, the joint mechanism 540 rotates the first forearm portion 244 around a rotational axis (fourth rotational axis) O5' orthogonal to the rotational axis O4' with respect to the upper arm portion 243, the twisting mechanism 550 rotates (twists) the second forearm portion 245 around a rotational axis (fifth rotational axis) O6' orthogonal to the rotational axis O5' with respect to the first forearm portion 244, the joint mechanism 560 rotates the wrist portion 246 around a rotational axis (sixth rotational axis) O7' orthogonal to the rotational axis O6' with respect to the second forearm portion 245, and the twisting mechanism 570 rotates (twists) the linking portion 247 around a rotational axis (seventh rotational axis) O8' orthogonal to the rotational axis O7' with respect to the wrist portion 246. According to such a robot arm 240, bending and stretching of joints (a shoulder, an elbow, a wrist) and twisting of an upper arm and a forearm can be realized, similar to a human arm, by virtue of the relatively simple configuration.

In addition, the rotational axis O2' may be parallel to an axis orthogonal to the rotational axis O1', the rotational axis O3' may be parallel to an axis orthogonal to the rotational axis O2', the rotational axis O4' may be parallel to an axis orthogonal to the rotational axis O3', the rotational axis O5' may be parallel to an axis orthogonal to the rotational axis O4', the rotational axis O6' may be parallel to an axis orthogonal to the rotational axis O5', the rotational axis O7' may be parallel to an axis orthogonal to the rotational axis O6', and the rotational axis O8' may be parallel to an axis orthogonal to the rotational axis O7'.

Although the configurations of the joint mechanism 510, the joint mechanism 520, the twisting mechanism 530, the joint mechanism 540, the twisting mechanism 550, the joint mechanism 560, and the twisting mechanism 570 are not particularly limited, respectively, these configurations are the same as the configuration of the aforementioned joint mechanism 310 in the present embodiment. That is, as illustrated in FIG. 4, the joint mechanism 510 has a motor 511 as a driving source, a reduction gear (not illustrated) that reduces the rotating speed of the motor 511, and a position sensor 512 that detects the rotational angle of the motor 511. Additionally, the joint mechanism 520 has a motor 521 as a driving source, a reduction gear (not illustrated) that reduces the rotating speed of the motor 521, and a position sensor 522 that detects the rotational angle of the motor 521. Additionally, the twisting mechanism 530 has a motor 531 as a driving source, a reduction gear (not illustrated) that reduces the rotating speed of the motor 531, and a position sensor 532 that detects the rotational angle of the motor 531. Additionally, the joint mechanism 540 has a motor 541 as a driving source, a reduction gear (not illustrated) that reduces the rotating speed of the motor 541, and a position sensor 542 that detects the rotational angle of the motor 541. Additionally, the twisting mechanism 550 has a motor 551 as a driving source, a reduction gear (not illustrated) that reduces the rotating speed of the motor 551, and a position sensor 552 that detects the rotational angle of the motor 551. Additionally, the joint mechanism 560 has a motor 561 as a driving source, a reduction gear (not illustrated) that reduces the rotating speed of the motor 561, and a position sensor 562 that detects the rotational angle of the motor 561.

Additionally, the twisting mechanism 570 has a motor 571 as a driving source, a reduction gear (not illustrated) that reduces the rotating speed of the motor 571, and a position sensor 572 that detects the rotational angle of the motor 571. In addition, the respective reduction gears may be omitted, respectively.

End Effectors

The end effector 610 or 620 to be attached to the tip of the robot arm 230 or 240 has, for example, a function of gripping an object. Although the configuration of the end effector 610 or 620 varies depending on the work that the end effector is made to perform, for example, as illustrated in FIG. 3, a configuration in which the end effector has a first finger 611 or 621 and a second finger 612 or 622 can be adopted. In the end effector 610 or 620 having such a configuration, an object can be gripped by adjusting the clearance between the first finger 611 or 621 and the second finger 612 or 622.

Angular Velocity Sensor

As illustrated in FIG. 1, the robot 200 is provided with an angular velocity sensor (third inertial sensor) 710, an angular velocity sensor (first inertial sensor) 720, and an angular velocity sensor (second inertial sensor) 730. The angular velocity sensor 710 is arranged at the trunk 220, the angular velocity sensor 720 is arranged at the robot arm 230, and the angular velocity sensor 730 is arranged at the robot arm 240. The three angular velocity sensors 710, 720, and 730 are respectively triaxial angular velocity sensors that can independently detect angular velocities ($\omega x$, $\omega y$, and $\omega z$ around the respective axes of three axes (an x-axis, a y-axis, and z-axis) that are orthogonal to each other.

Here, although the arrangements of the angular velocity sensors 720 and 730 in the robot arms 230 and 240 are not particularly limited, the angular velocity sensors 720 and 730 are arranged at the linking portions 237 and 247, respectively, in the present embodiment.

In addition, although the postures of the angular velocity sensors 710, 720, and 730 are not particularly limited, it is preferable that the angular velocity sensor 710 is provided at the trunk 220 so that one (for example, the z-axis) of three detection axes, that is, the x-axis, the y-axis, and the z-axis becomes parallel to the rotational axis O1 of the trunk 220. Additionally, it is preferable that the angular velocity sensor 720 is provided at the linking portion 237 so that one of the x-axis, the y-axis, and the z-axis becomes parallel to the rotational axis O8 of the linking portion 237. Additionally, it is preferable that the angular velocity sensor 730 is provided at the linking portion 247 so that one of the x-axis, the y-axis, and the z-axis becomes parallel to the rotational axis O8' of the linking portion 247.

The angular velocity sensors 710, 720, and 730 are not particularly limited, and known angular velocity sensors can be used as the angular velocity sensors if the angular velocities ($\omega x$, $\omega y$, and $\omega z$ around the respective axes of the three axes (the x-axis, the y-axis, and the z-axis) that are orthogonal to each other can be detected, respectively. Additionally, material costs can be reduced by making the angular velocity sensors 710, 720, and 730 have the same configuration as each other. In addition, the angular velocity sensors 710, 720, and 730 may be, for example, biaxial angular velocity sensors or uniaxial angular velocity sensors, without being limited to the triaxial angular velocity sensors.

The angular velocity sensors 710, 720, and 730 detect the angular velocities ($\omega x$, $\omega y$, and $\omega z$ around the respective axes in the installation places of the angular velocity sensors 710, 720, and 730, respectively. The detection results of three angular velocity sensors 710, 720, and 730, that is, signals output from the angular velocity sensors 710, 720, and 730 are input to the robot control device 900. Then, the robot control device 900 performs predetermined control, such as the control of suppressing the vibration of the trunk 220, the robot arm 230, and the robot arm 240, on the basis of the detection results.

Robot Control Device

The robot control device 900 can independently actuate the trunk 220 and the robot arms 230 and 240, respectively. In other words, the robot control device 900 can independently control the respective motors 311, 411 to 471, and 511 to 571 included in the respective joint mechanisms 310, 410, 420, 440, 460, 510, 520, 540, and 560 and the respective twisting mechanisms 430, 450, 470, 530, 550, and 570 via motor drivers or the like. In this case, the robot control device 900 performs detection, using the position sensors 312, 412 to 472, and 512 to 572 and the angular velocity sensors 710 to 730, and controls the driving (for example, angular velocities, rotational angles, and the like) of the respective motors 311, 411 to 471, and 511 to 571, that is, controls the actuation thereof while suppressing the vibration of the trunk 220 and the robot arms 230 and 240, on the basis of the detection results. Programs for this control is stored in advance in a storage unit 930 built in the robot control device 900.

As illustrated in FIG. 4, specifically, the robot control device 900 has a first driving source controller (controller) 901 that controls the driving of the motor 311, a second driving source controller (controller) 902 that controls the driving of the motor 411, a third driving source controller (controller) 903 that controls the driving of the motor 421, a fourth driving source controller (controller) 904 that controls the driving of the motor 431, a fifth driving source controller (controller) 905 that controls the driving of the motor 441, a sixth driving source controller (controller) 906 that controls the driving of the motor 451, a seventh driving source controller (controller) 907 that controls the driving of the motor 461, an eighth driving source controller (controller) 908 that controls the driving of the motor 471, a ninth driving source controller (controller) 909 that controls the driving of the motor 511, a tenth driving source controller (controller) 910 that controls the driving of the motor 521, an eleventh driving source controller (controller) 911 that controls the driving of the motor 531, a twelfth driving source controller (controller) 912 that controls the driving of the motor 541, a thirteenth driving source controller (controller) 913 that controls the driving of the motor 551, a fourteenth driving source controller (controller) 914 that controls the driving of the motor 561, and a fifteenth driving source controller (controller) 915 that controls the driving of the motor 571.

Since the configurations of the first to fifteenth driving source controllers 901 to 915 are the same as each other, the first driving source controller 901, the second driving source controller 902, and the ninth driving source controller 909 will be representatively described below, and the description of the other third to eighth driving source controllers 903 to 908 and the tenth to fifteenth driving source controllers 910 to 915 will be omitted.

As illustrated in FIG. 5, the first driving source controller 901 has a subtractor 901a, a position controller 901b, a subtractor 901c, an angular velocity controller 901d, a rotational angle calculator 901e, an angular velocity calculator 901f, a subtractor 901g, a converter 901h, a correction value calculator 901i, an adder 901j, a feedback gain adjustor 901k, and an angular velocity calculator 901m. In addition, an angular velocity detector that detects the angular velocity of the trunk 220 around the rotational axis O1 is constituted by the angular velocity calculator 901m and the angular velocity sensor 710.

Here, the robot control device 900 computes a target position of the end effector 610 (or 620) on the basis of the contents of the processing that the robot system. 100 performs, and generates a track for moving the end effector 610 (or 620) to the target position. Then, the robot control device 900 measures the rotational angles of the respective driving sources 401 to 407 in every predetermined control cycle so that the end effector 610 (or 620) moves along the generated track, and outputs values computed on the basis of the measurement results to the respective motors as position commands Pc of the respective motors, respectively. In addition, although "values are input and output" or the like are written in the above and the following, this means "signals corresponding to the values are input and output".

As illustrated in FIG. 5, in addition to a position command Pc of the motor 311, detection signals are input from the position sensor 312 and the angular velocity sensor 710, respectively, to the first driving source controller 901. The first driving source controller 901 drives the motor 311 through a feedback control using the respective detection signals so that a rotational angle (position feedback value Pfb) of the motor 311 calculated from the detection signal of the position sensor 312 becomes the position command Pc and an angular velocity feedback value ωfb to be described below becomes an angular velocity command ωc to be described below.

That is, the position command Pc is input to the subtractor 901a of the first driving source controller 901, and the position feedback value Pfb to be described below is input from the rotational angle calculator 901e. In the rotational angle calculator 901e, the number of pulses input from the position sensor 312 is counted, and the rotational angle of the motor 311 according to the counted value is output to the subtractor 901a as the position feedback value Pfb. The subtractor 901a outputs a deviation (value obtained by subtracting the position feedback value Pfb from the target value of the rotational angle of the motor 311) between the position command Pc and the position feedback value Pfb to the position controller 901b.

The position controller 901b performs predetermined computation processing using the deviation input from the subtractor 901a, a proportional gain that is a predetermined factor, or the like and computes a target value of the angular velocity of the motor 311 according to the deviation. The position controller 901b outputs a signal showing the target value (command value) of the angular velocity of the motor 311 to the subtractor 901c as the angular velocity command ωc. In addition, in the present embodiment, a proportional control (P control) is performed as the feedback control. However, the feedback control is not limited to this.

The angular velocity command ωc and the angular velocity feedback value ωfb to be described below are input to the subtractor 901c. The subtractor 901c outputs a deviation (value obtained by subtracting the angular velocity feedback value ωfb from the target value of the angular velocity of the motor 311) between the angular velocity command ωc and the angular velocity feedback value ωfb to the angular velocity controller 901d.

The angular velocity controller 901d performs predetermined computation processing including integration, using the deviation input from the subtractor 901c, the proportional gain that is a predetermined factor, an integration gain, or the like, thereby generating a driving signal (proportional to a driving current) of the motor 311 according to the deviation, and supplies the driving signal to the motor 311 via a motor driver. In addition, in the present embodiment, a PI control is performed as the feedback control. However, the feedback control is not limited to this.

In this way, the feedback control is performed and the driving current of the motor 311 is controlled so that the position feedback value Pfb is as equal to the position command Pc as possible and the angular velocity feedback value ωfb is as equal to the angular velocity command ωe as possible.

Next, the angular velocity feedback value ωfb in the first driving source controller 901 will be described.

In the angular velocity calculator 901f, an angular velocity ωm1 of the motor 311 is calculated on the basis of the frequency of a pulse signal input from the position sensor 312, and the angular velocity ωm1 is output to the adder 901j.

Additionally, in the angular velocity calculator 901f, an angular velocity ωA1m of the trunk 220 around the rotational axis O1 is calculated on the basis of the frequency of the pulse signal input from the position sensor 312, and the angular velocity ωA1m is output to the subtractor 901g. In addition, the angular velocity ωA1m is a value obtained by dividing the angular velocity ωm1 by a reduction ratio between the motor 311 and the trunk 220, that is, in the joint mechanism 310.

Additionally, angular velocities around the respective detection axes are detected by the angular velocity sensor 710, and detection values thereof are output to the angular velocity calculator 901m. In the angular velocity calculator 901m, an angular velocity ωA1 of the trunk 220 around the rotational axis O1 is calculated on the basis of the detection values, and the angular velocity ωA1 is output to the subtractor 901g.

The angular velocity ωA1 and the angular velocity ωA1m are input to the subtractor 901g, and the subtractor 901g outputs a value ωA1s (=ωA1−ωA1m) obtained by subtracting the angular velocity ωA1m from the angular velocity ωA1 to the converter 901h. The value ωA1s is equivalent to a vibration component (vibration angular velocity) of the angular velocity of the trunk 220 around the rotational axis O1. Hereinafter, ωA1s is referred to as a vibration angular velocity. In the present embodiment, a feedback control is performed in which the vibration angular velocity ωA1s (in detail, an angular velocity ωm1s in the motor 311 that is a value generated on the basis of the vibration angular velocity ωA1s) is multiplied by a gain Kc to be described below and is returned to an input side of the motor 311. Specifically, a feedback control is performed on the motor 311 so that the vibration angular velocity ωA1s becomes as close to 0 as possible. Accordingly, the vibration of the trunk 220 can be suppressed, and the vibration of the robot system 100 can be suppressed by this. In addition, the angular velocity of the motor 311 is controlled in this feedback control.

The converter 901h converts the vibration angular velocity ωA1s into the angular velocity ωm1s in the motor 311, and outputs the angular velocity ωm1s to the correction value calculator 901i. This conversion can be obtained by multiplying the vibration angular velocity ωA1s by the reduction ratio between the motor 311 and the trunk 220, that is, in the joint mechanism 310.

The correction value calculator 901i multiplies the angular velocity ωm1s by the gain (feedback gain) Kc that is a predetermined factor, obtains a correction value (third correction component) Kc·ωm1s, and outputs the correction value Kc·ωm1s to the adder 901j. The gain Kc is adjusted by the feedback gain adjustor 901k. In addition, the adjustment of the gain Kc will be described below in detail.

The angular velocity ωm1 and the correction value Kc·®m1s are input to the adder 901j. The adder 901j outputs an addition value of the angular velocity ωm1 and the correction value Kc·®m1s to the subtractor 901c as the angular velocity feedback value ωfb. In addition, the subsequent operation is as mentioned above.

As mentioned above, since the configurations of the second to eighth driving source controllers 902 to 908 are the same as each other, the second driving source controller 902 will be representatively described.

As illustrated in FIG. 6, the second driving source controller 902 has a subtractor 902a, a position controller 902b, a subtractor 902c, an angular velocity controller 902d, an angular velocity calculator 902f, a subtractor 902g, a converter 902h, a correction value calculator 902i, an adder 902j, a feedback gain adjustor 902k, an angular velocity calculator 902m, and a rotational angle calculator 902e. In addition, an angular velocity detector that detects the angular velocity of the first shoulder portion 231 around the rotational axis O2 is constituted by the angular velocity calculator 902m and the angular velocity sensor 720.

In addition to a position command Pc of the motor 411, detection signals are input from the position sensor 412 and the angular velocity sensor 720, respectively, to the second driving source controller 902. The second driving source controller 902 drives the motor 411 through a feedback control using the respective detection signals so that a rotational angle (position feedback value Pfb) of the motor 411 calculated from the detection signal of the position sensor 412 becomes the position command Pc and an angular velocity feedback value ωfb to be described below becomes an angular velocity command We to be described below.

That is, the position command Pc is input to the subtractor 902a of the second driving source controller 902, and the position feedback value Pfb to be described below is input from the rotational angle calculator 902e. In the rotational angle calculator 902e, the number of pulses input from the position sensor 412 is counted, and the rotational angle of the motor 411 according to the counted value is output to the subtractor 902a as the position feedback value Pfb. The subtractor 902a outputs a deviation (value obtained by subtracting the position feedback value Pfb from the target value of the rotational angle of the motor 411) between the position command Pc and the position feedback value Pfb to the position controller 902b.

The position controller 902b performs predetermined computation processing using the deviation input from the subtractor 902a, a proportional gain that is a predetermined factor, or the like and computes a target value of the angular velocity of the motor 411 according to the deviation. The position controller 902b outputs a signal showing the target value (command value) of the angular velocity of the motor 411 to the subtractor 902c as the angular velocity command ωc. In addition, in the present embodiment, a proportional control (P control) is performed as the feedback control. However, the feedback control is not limited to this.

The angular velocity command ωc and the angular velocity feedback value ωfb to be described below are input to the subtractor 902c. The subtractor 902c outputs a deviation (value obtained by subtracting the angular velocity feedback value ωfb from the target value of the angular velocity of the motor 411) between the angular velocity command ωc and the angular velocity feedback value ωfb to the angular velocity controller 902d.

The angular velocity controller 902*d* performs predetermined computation processing including integration, using the deviation input from the subtractor 902*c*, the proportional gain that is a predetermined factor, an integration gain, or the like, thereby generating a driving signal (proportional to a driving current) of the motor 411 according to the deviation, and supplies the driving signal to the motor 411 via a motor driver. In addition, in the present embodiment, a PI control is performed as the feedback control. However, the feedback control is not limited to this.

In this way, the feedback control is performed and the driving current of the motor 411 is controlled so that the position feedback value Pfb is as equal to the position command Pc as possible and the angular velocity feedback value ωfb is as equal to the angular velocity command ωc as possible.

Next, the angular velocity feedback value ωfb in the second driving source controller 902 will be described.

In the angular velocity calculator 902*f*, an angular velocity ωm2 of the motor 411 is calculated on the basis of the frequency of a pulse signal input from the position sensor 412, and the angular velocity ωm2 is output to the adder 902*j*.

Additionally, in the angular velocity calculator 902*f*, an angular velocity ωA2m of the first shoulder portion 231 around the rotational axis O2 is calculated on the basis of the frequency of the pulse signal input from the position sensor 412, and the angular velocity ωA2m is output to the subtractor 902*g*. In addition, the angular velocity ωA2m is a value obtained by dividing the angular velocity ωm2 by a reduction ratio between the motor 411 and the first shoulder portion 231, that is, in the joint mechanism 410.

Additionally, angular velocities around the respective detection axes are detected by the angular velocity sensor 720, and detection values thereof are output to the angular velocity calculator 902*m*. In the angular velocity calculator 902*m*, an angular velocity ωA2 of the first shoulder portion 231 around the rotational axis O2 is calculated on the basis of the detection values, and the angular velocity ωA2 is output to the subtractor 902*g*.

The angular velocity ωA2 and the angular velocity ωA2m are input to the subtractor 902*g*, and the subtractor 902*g* outputs a value ωA2s (=ωA2−ωA2m) obtained by subtracting the angular velocity ωA2m from the angular velocity ωA2 to the converter 902*h*. The value ωA2s is equivalent to a vibration component (vibration angular velocity) of the angular velocity of the first shoulder portion 231 around the rotational axis O2. Hereinafter, ωA2s is referred to as a vibration angular velocity. In the present embodiment, a feedback control is performed in which the vibration angular velocity ωA2s (in detail, an angular velocity ωm2s in the motor 411 that is a value generated on the basis of the vibration angular velocity ωA2s) is multiplied by a gain Ka to be described below and is returned to an input side of the motor 411. Specifically, a feedback control is performed on the motor 411 so that the vibration angular velocity ωA2s becomes as close to 0 as possible. Accordingly, the vibration of the first shoulder portion 231 can be suppressed, and the vibration of the robot system 100 can be suppressed by this. In addition, the angular velocity of the motor 411 is controlled in this feedback control.

The converter 902*h* converts the vibration angular velocity ωA2s into the angular velocity ωm2s in the motor 411, and outputs the angular velocity ωm2s to the correction value calculator 902*i*. This conversion can be obtained by multiplying the vibration angular velocity ωA2s by the reduction ratio between the motor 411 and the first shoulder portion 231, that is, in the joint mechanism 410.

The correction value calculator 902*i* multiplies the angular velocity ωm2s by a gain (feedback gain) Ka that is a predetermined factor, obtains a correction value (first correction component) Ka·ωm2s, and outputs the correction value Ka·ωm2s to the adder 902*j*. The gain Ka is adjusted by the feedback gain adjustor 902*k*. In addition, the adjustment of the gain Ka will be described below in detail.

The angular velocity ωm2 and the correction value Ka·ωm2s are input to the adder 902*j*. The adder 902*j* outputs an addition value of the angular velocity ωm2 and the correction value Ka·ωm2s to the subtractor 902*c* as the angular velocity feedback value ωfb. In addition, the subsequent operation is as mentioned above.

In addition, here, the angular velocity ωA1 of the trunk 220 around the rotational axis O1 calculated on the basis of the detection values of the angular velocity sensor 710 is an angular velocity around the Z-axis, and the angular velocity around the Z-axis is defined as ωwz. Additionally, in the control operation of the second driving source controller 902, if the angular velocity of the first shoulder portion 231 around the X-axis, the angular velocity thereof around the Y-axis, the angular velocity thereof around the Z-axis, which are calculated on the basis of the detection values of the angular velocity sensor 720, are defined as ωax, ωay, and ωaz, respectively, the angular velocity ωwz of the trunk 220 around the Z-axis is included in the angular velocity ωaz around the Z-axis. For this reason, as for the first shoulder portion 231, (ωaz−ωwz) is dealt with as an angular velocity around a true Z-axis. In addition, the values of the angular velocity ωax around the X-axis and the angular velocity ωay around the Y-axis are used. In this way, the first correction component of the angular velocity of the first shoulder portion 231 around the Z-axis is obtained on the basis of the detection results of the angular velocity sensors 710 and 720, and the first correction component of the angular velocity thereof around the X-axis and the first correction component of the angular velocity thereof around the Y-axis are obtained on the basis of the detection result of the angular velocity sensor 720.

As mentioned above, since the configurations of the ninth to fifteenth driving source controllers 909 to 915 are the same as each other, the ninth driving source controller 909 will be representatively described.

As illustrated in FIG. 7, the ninth driving source controller 909 has a subtractor 909*a*, a position controller 909*b*, a subtractor 909*c*, an angular velocity controller 909*d*, an angular velocity calculator 909*f*, a subtractor 909*g*, a converter 909*h*, a correction value calculator 909*i*, an adder 909*j*, a feedback gain adjustor 909*k*, an angular velocity calculator 909*m*, and a rotational angle calculator 909*e*. In addition, an angular velocity detector that detects the angular velocity of the first shoulder portion 241 around the rotational axis O2' is constituted by the angular velocity calculator 909*m* and the angular velocity sensor 730.

In addition to a position command Pc of the motor 511, detection signals are input from the position sensor 512 and the angular velocity sensor 730, respectively, to the ninth driving source controller 909. The ninth driving source controller 909 drives the motor 511 through a feedback control using the respective detection signals so that a rotational angle (position feedback value Pfb) of the motor 511 calculated from the detection signal of the position sensor 512 becomes the position command Pc and an angular velocity feedback value ωfb to be described below becomes an angular velocity command ωc to be described below.

That is, the position command Pc is input to the subtractor 909a of the ninth driving source controller 909, and the position feedback value Pfb to be described below is input from the rotational angle calculator 909e. In the rotational angle calculator 909e, the number of pulses input from the position sensor 512 is counted, and the rotational angle of the motor 511 according to the counted value is output to the subtractor 909a as the position feedback value Pfb. The subtractor 909a outputs a deviation (value obtained by subtracting the position feedback value Pfb from the target value of the rotational angle of the motor 511) between the position command Pc and the position feedback value Pfb to the position controller 909b.

The position controller 909b performs predetermined computation processing using the deviation input from the subtractor 909a, a proportional gain that is a predetermined factor, or the like and computes a target value of the angular velocity of the motor 511 according to the deviation. The position controller 909b outputs a signal showing the target value (command value) of the angular velocity of the motor 511 to the subtractor 909c as the angular velocity command ωc. In addition, in the present embodiment, a proportional control (P control) is performed as the feedback control. However, the feedback control is not limited to this.

The angular velocity command ωc and the angular velocity feedback value ωfb to be described below are input to the subtractor 909c. The subtractor 909c outputs a deviation (value obtained by subtracting the angular velocity feedback value ωfb from the target value of the angular velocity of the motor 511) between the angular velocity command ωc and the angular velocity feedback value ωfb to the angular velocity controller 909d.

The angular velocity controller 909d performs predetermined computation processing including integration, using the deviation input from the subtractor 909c, the proportional gain that is a predetermined factor, an integration gain, or the like, thereby generating a driving signal (proportional to a driving current) of the motor 511 according to the deviation, and supplies the driving signal to the motor 511 via a motor driver. In addition, in the present embodiment, a PI control is performed as the feedback control. However, the feedback control is not limited to this.

In this way, the feedback control is performed and the driving current of the motor 511 is controlled so that the position feedback value Pfb is as equal to the position command Pc as possible and the angular velocity feedback value ωfb is as equal to the angular velocity command ωe as possible.

Next, the angular velocity feedback value ωfb in the ninth driving source controller 909 will be described.

In the angular velocity calculator 909f, an angular velocity ωm9 of the motor 511 is calculated on the basis of the frequency of a pulse signal input from the position sensor 512, and the angular velocity ωm9 is output to the adder 909j.

Additionally, in the angular velocity calculator 909f, an angular velocity ωA9m of the first shoulder portion 241 around the rotational axis O2' is calculated on the basis of the frequency of the pulse signal input from the position sensor 512, and the angular velocity ωA9m is output to the subtractor 909g. In addition, the angular velocity ωA9m is a value obtained by dividing the angular velocity ωm9 by a reduction ratio between the motor 511 and the first shoulder portion 241, that is, in the joint mechanism 510.

Additionally, angular velocities around the respective detection axes are detected by the angular velocity sensor 730, and detection values thereof are output to the angular velocity calculator 909m. In the angular velocity calculator 909m, an angular velocity ωA9 of the first shoulder portion 241 around the rotational axis O2' is calculated on the basis of the detection values, and the angular velocity ωA9 is output to the subtractor 909g.

The angular velocity ωA9 and the angular velocity ωA9m are input to the subtractor 909g, and the subtractor 909g outputs a value ωA9s (=ωA9−ωA9m) obtained by subtracting the angular velocity ωA9m from the angular velocity ωA9 to the converter 909h. The value ωA9s is equivalent to a vibration component (vibration angular velocity) of the angular velocity of the first shoulder portion 241 around the rotational axis O2'. Hereinafter, ωA9s is referred to as a vibration angular velocity. In the present embodiment, a feedback control is performed in which the vibration angular velocity ωA9s (in detail, an angular velocity ωm9s in the motor 511 that is a value generated on the basis of the vibration angular velocity ωA9s) is multiplied by a gain Kb to be described below and is returned to an input side of the motor 511. Specifically, a feedback control is performed on the motor 511 so that the vibration angular velocity ωA9s becomes as close to 0 as possible. Accordingly, the vibration of the first shoulder portion 241 can be suppressed, and the vibration of the robot system 100 can be suppressed by this. In addition, the angular velocity of the motor 511 is controlled in this feedback control.

The converter 909h converts the vibration angular velocity ωA9s into the angular velocity ωm9s in the motor 511, and outputs the angular velocity ωm9s to the correction value calculator 909i. This conversion can be obtained by multiplying the vibration angular velocity ωA9s by the reduction ratio between the motor 511 and the first shoulder portion 241, that is, in the joint mechanism 510.

The correction value calculator 909i multiplies the angular velocity ωm9s by a gain (feedback gain) Kb that is a predetermined factor, obtains a correction value (second correction component) Kb·ωm9s, and outputs the correction value Kb·ωm9s to the adder 909j. The gain Kb is adjusted by the feedback gain adjustor 909k. In addition, the adjustment of the gain Kb will be described below in detail.

The angular velocity ωm9 and the correction value Kb·ωm9s are input to the adder 909j. The adder 909j outputs an addition value of the angular velocity ωm9 and the correction value Kb·ωm9s to the subtractor 909c as the angular velocity feedback value ωfb. In addition, the subsequent operation is as mentioned above.

Additionally, in the control operation of the ninth driving source controller 909, if the angular velocity of the first shoulder portion 241 around the X-axis, the angular velocity thereof around the Y-axis, the angular velocity thereof around the Z-axis, which are calculated on the basis of the detection values of the angular velocity sensor 730, are defined as ωax', ωay', and ωaz', respectively, the angular velocity ωwz of the trunk 220 around the Z-axis is included in the angular velocity ωaz' around the Z-axis. For this reason, as for the first shoulder portion 241, (ωaz'−ωwz) is dealt with as an angular velocity around a true Z-axis. In addition, the values of the angular velocity ωax' around the X-axis and the angular velocity ωay' around the Y-axis are used. In this way, the second correction component of the angular velocity of the first shoulder portion 241 around the Z-axis is obtained on the basis of the detection results of the angular velocity sensors 710 and 730, and the second correction component of the angular velocity thereof around the X-axis and the second correction component of the angular velocity thereof around the Y-axis are obtained on the basis of the detection result of the angular velocity sensor 730.

Here, in the robot system 100, it is preferable that the gain Kc of the third correction component is greater than the gain Ka of the first correction component and the gain Kb of the second correction component. That is, it is preferable that Kc/Ka is greater than 1, it is more preferable that Kc/Ka is equal to or greater than 1.5, and it is still more preferable that Kc/Ka is equal to or greater than 1.5 and equal to or less than 5. Additionally, it is preferable that Kc/Kb is greater than 1, it is more preferable that Kc/Kb is equal to or greater than 1.5, and it is still more preferable that Kc/Kb is equal to or greater than 1.5 and equal to or less than 5. Accordingly, the stiffness of the trunk 220 around the rotational axis O1 becomes equivalently high. As a result, the effect of suppressing the vibration of the robot arms 230 and 240 and the trunk 220 can be enhanced. In addition, Kc/Ka and Kc/Kb may be equal to each other or may be different from each other.

Additionally, it is preferable that the robot control device 900 adjusts the gain Kc in accordance with the posture(s) of at least one or both of the robot arm 230 and the robot arm 240.

Specifically, when the posture of the robot 200 is a first posture and when the posture of the robot 200 is a second posture in which the moment of inertia of the robot 200 around the rotational axis O1 is greater than that of the first posture, it is more preferable that the gain Kc in the second posture is made greater than that in the first posture. That is, it is so preferable that, as the moment of inertia of the robot 200 around the rotational axis O1 is greater, the gain Kc is made greater.

Accordingly, the effect of suppressing the vibration of the robot arms 230 and 240 and the trunk 220 can be enhanced.

Additionally, in the robot system 100, in an operation in which the robot arm 240 is brought into a stationary state and the robot arm 230 is rotated around the rotational axis O1 from the stationary state and moved to a target position, the following Expression (1) is satisfied when a maximum value of the amplitude of the angular velocity of the trunk 220 around the rotational axis O1, which is obtained on the basis of a detection result of the angular velocity sensor 710 and obtained before the robot arm 230 reaches the target position is defined as A (refer to FIG. 12), and a maximum value of the amplitude of the angular velocity of the trunk 220 around the rotational axis O1, which is obtained on the basis of the detection result of the angular velocity sensor 710 and obtained after the robot arm 230 has reached the target position first is defined as B (refer to FIG. 12). In addition, in the operation in which the robot arm 230 is moved from the stationary state to the target position, as illustrated in FIG. 8, the upper arm portion 233 of the robot arm 230 is rotated around the rotational axis O4 by 90° in a state where the angle formed between a central axis (longitudinal axis) 2331 (rotational axis O4) extending in a longitudinal direction of the upper arm portion 233 of the robot arm 230 and a central axis (longitudinal axis) 2341 extending in a longitudinal direction of the first forearm portion 234 is made to be 90° and the rotational axis O1 and the rotational axis O4 are made parallel to each other. Additionally, in the operation in which the robot arm 230 is moved from the stationary state to the target position, the aforementioned control of suppressing the vibration is also performed for the robot arm 240 and the trunk 220 in the stationary state.

$$B/A<0.27 \tag{1}$$

Accordingly, the stiffness of the trunk 220 around the rotational axis O1 becomes equivalently high. As a result the effect of suppressing the vibration of the robot arms 230 and 240 and the trunk 220 when the robot arm 230 is actuated can be enhanced.

In addition, it is more preferable that B/A<0.16 is established.

Here, the above "stationary state" is a state where the robot arm 240 is not positively moved, and includes not only a case where the robot arm 240 is completely stationary but also, for example, a state where vibration occurs in the robot arm 240, a state where the robot arm 240 is operating in order to suppress vibration, or the like.

For example, in the robot system 100, the following teaching JOB is generated using teaching pendants. In this JOB, even if the velocity of POSITION/1 and POSITION/3 is 0, there may be vibration. It is said that this is also stationary (stationary state).
POSITION/1: A determination button is pushed when a user moves the robot to bring the robot to POSITION/1
VELOCITY/0: Velocity input
LINEAR: Moved linearly from POSITION/1 to POSITION/2 (movement is also input)
POSITION/2:
VELOCITY/MIDDLE:
LINEAR: Moved linearly from POSITION/2 to POSITION/3
POSITION/3:
VELOCITY/0:

In addition, POSITION/1 is a stationary operation starting point, and POSITION/3 is a stopping operation ending point.

Additionally, the above "amplitude of the angular velocity of the trunk 220 around the rotational axis O1", as illustrated in FIG. 12, is the amplitude (for example, A or B in FIG. 12) of a waveform of a graph when the horizontal axis of the graph represents time and the vertical axis represents the angular velocity of the trunk 220 around the rotational axis O1.

Additionally, the angular velocity is a value measured by the angular velocity sensor 710, using six-axis inertial sensors "AH-6120LR" made by Seiko Epson Corporation, respectively, as the angular velocity sensors 710, 720, and 730.

Similarly, in an operation in which the first robot arm is brought into a stationary state and the second robot arm is rotated around the axis from the stationary state and moved to a target position, the following Expression (2) is satisfied when a maximum value of the amplitude of the angular velocity of the trunk around the axis, which is obtained on the basis of a detection result of the third inertial sensor and obtained before the second robot arm reaches the target position, is defined as C, and a maximum value of the amplitude of the angular velocity of the trunk around the axis, which is obtained on the basis of the detection result of the third inertial sensor and obtained after the second robot arm has reached the target position first is defined as D. In addition, in the operation in which the robot arm 240 is moved from the stationary state to the target position, as illustrated in FIG. 9, the upper arm portion 243 of the robot arm 240 is rotated around the rotational axis O4' by 90° in a state where the angle formed between a central axis (longitudinal axis) 2431 (rotational axis O4') extending in a longitudinal direction of the upper arm portion 243 of the robot arm 240 and a central axis (longitudinal axis) 2441 extending in a longitudinal direction of the first forearm portion 244 is made to be 90° and the rotational axis O1 and the rotational axis O4' are made parallel to each other. Additionally, in the operation in which the robot arm 240 is moved from the stationary state to the target position, the aforementioned control of suppressing the vibration is also performed for the robot arm 230 and the trunk 220 in the stationary state.

$$D/C<0.27 \qquad (2)$$

Accordingly, the stiffness of the trunk 220 around the rotational axis O1 becomes equivalently high. As a result the effect of suppressing the vibration of the robot arms 230 and 240 and the trunk 220 when the robot arm 240 is actuated can be enhanced.

In addition, it is more preferable that D/C<0.16 is established.

Additionally, B/A and D/C may be equal to each other or may be different from each other.

Next, the gain Ka of the first correction component regarding the robot arm 230, the gain Kb of the second correction component regarding the robot arm 240, and the gain Kc of the third correction component regarding the trunk 220 were changed, and the following experiments were conducted. In addition, the experiments were conducted in four patterns of a case where the gains Ka and Kb are 0 and the gain Kc is 0 (comparative example), a case where the gains Ka and Kb are 0.25 and the gain Kc is 0 (comparative example), a case where the gains Ka and Kb are 0.25 and the gain Kc is 0.25 (the invention), and a case where the gains Ka and Kb are 0.25 and the gain Kc is 0.5 (the invention).

As illustrated in FIG. 8, the upper arm portion 233 of the robot arm 230 was rotated around the rotational axis O4 by 90° in a state where the robot arm 240 was brought into the stationary state and the angle formed between the central axis 2331 extending in the longitudinal direction of the upper arm portion 233 of the robot arm 230 and the central axis 2341 extending in the longitudinal direction of the first forearm portion 234 is made to be 90° and the rotational axis O1 and the rotational axis O4 are made parallel to each other. Then, the angular velocity of the trunk 220 around the rotational axis O1 (Z-axis) was obtained by the angular velocity sensor 730, and the angular velocity of the tip portion of the robot arm 230 around the rotational axis O1 (Z-axis) was obtained by the angular velocity sensor 720. The results are as illustrated in the graphs of FIGS. 10 and 11. In addition, the graph of FIG. 11 illustrates the vertical axis of the graph of FIG. 10 in an enlarged manner. Additionally, the standstill start timing (setting start timing) in FIG. 11 is when the robot arm 230 has reached the target position first, that is, when the upper arm portion 233 has been rotated around the rotational axis O4 by 90° (this is also the same in FIG. 12).

Additionally, the angular velocity of the trunk 220 around the Z-axis (rotational axis O1) is illustrated in FIG. 12. Additionally, the maximum value A of the amplitude of the angular velocity of the trunk 220 around the rotational axis O1 before the robot arm 230 reaches the target position and the maximum value B of the amplitude of the angular velocity of the trunk 220 around the rotational axis O1 after the robot arm 230 has reached the target position first are illustrated in FIG. 12.

Figure 13:
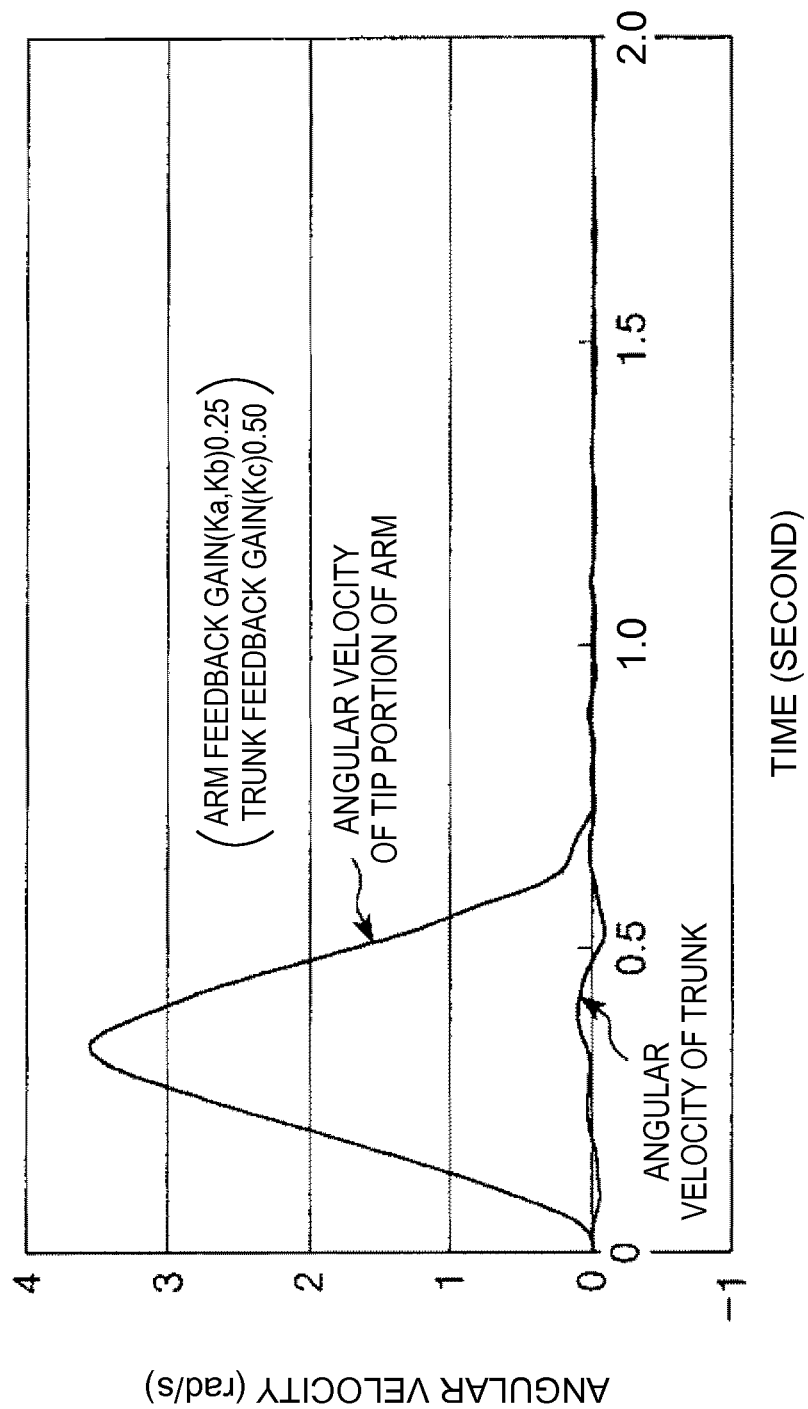
FIG. 13 is a graph illustrating the angular velocity of the tip portion of the robot arm and the angular velocity of the trunk in the robot of the robot system illustrated in FIG. 1.
Figure 14:
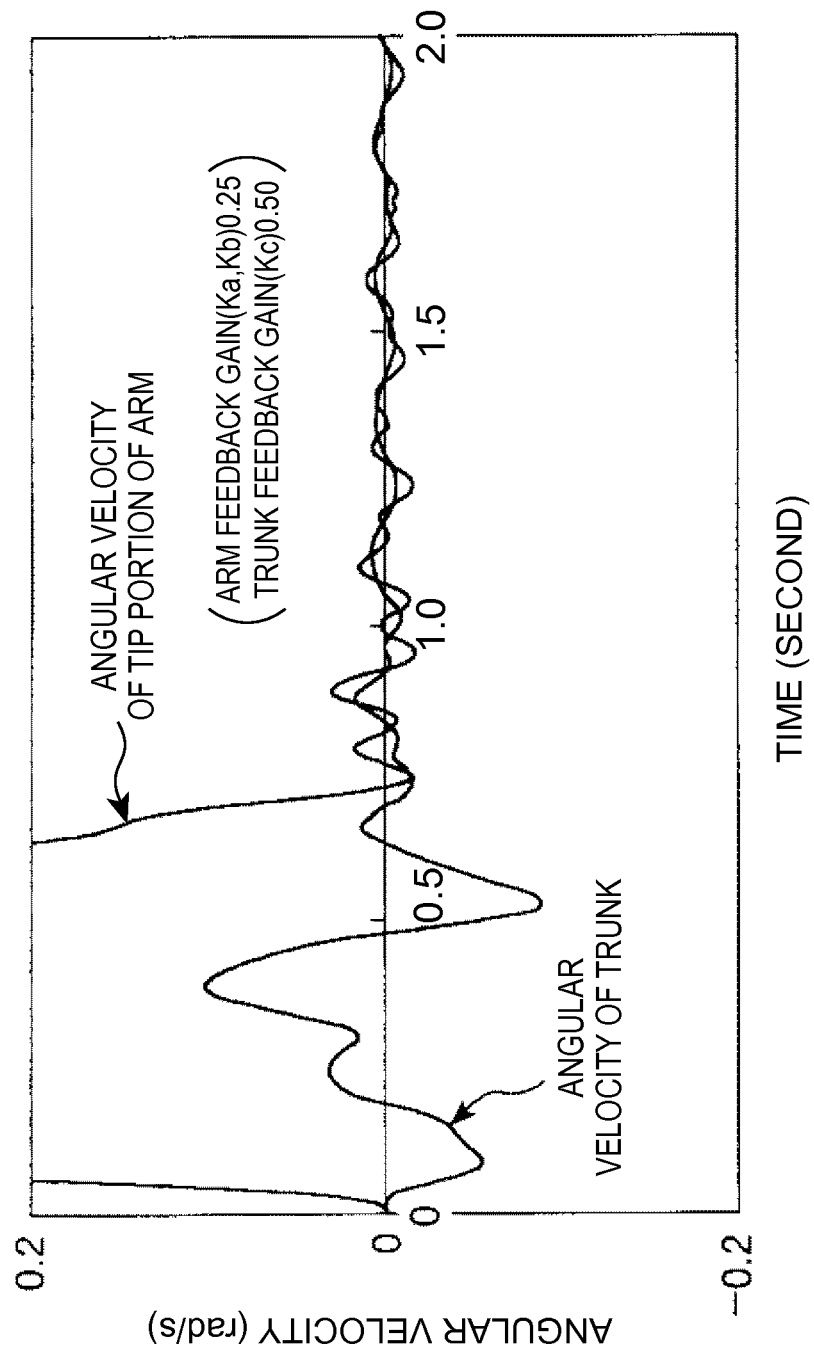
FIG. 14 is a graph illustrating the angular velocity of the tip portion of the robot arm and the angular velocity of the trunk in the robot of the robot system illustrated in FIG. 1.

Additionally, the angular velocity of the tip portion of the robot arm 230 around the rotational axis O1 and the angular velocity of the trunk 220 around the rotational axis O1 when the gains Ka and Kb are 0.25 and the gain Kc is 0.5 (the invention) are illustrated in FIG. 13 and FIG. 14. In addition, the graph of FIG. 14 illustrates the vertical axis of the graph of FIG. 13 in an enlarged manner.

Figure 15:
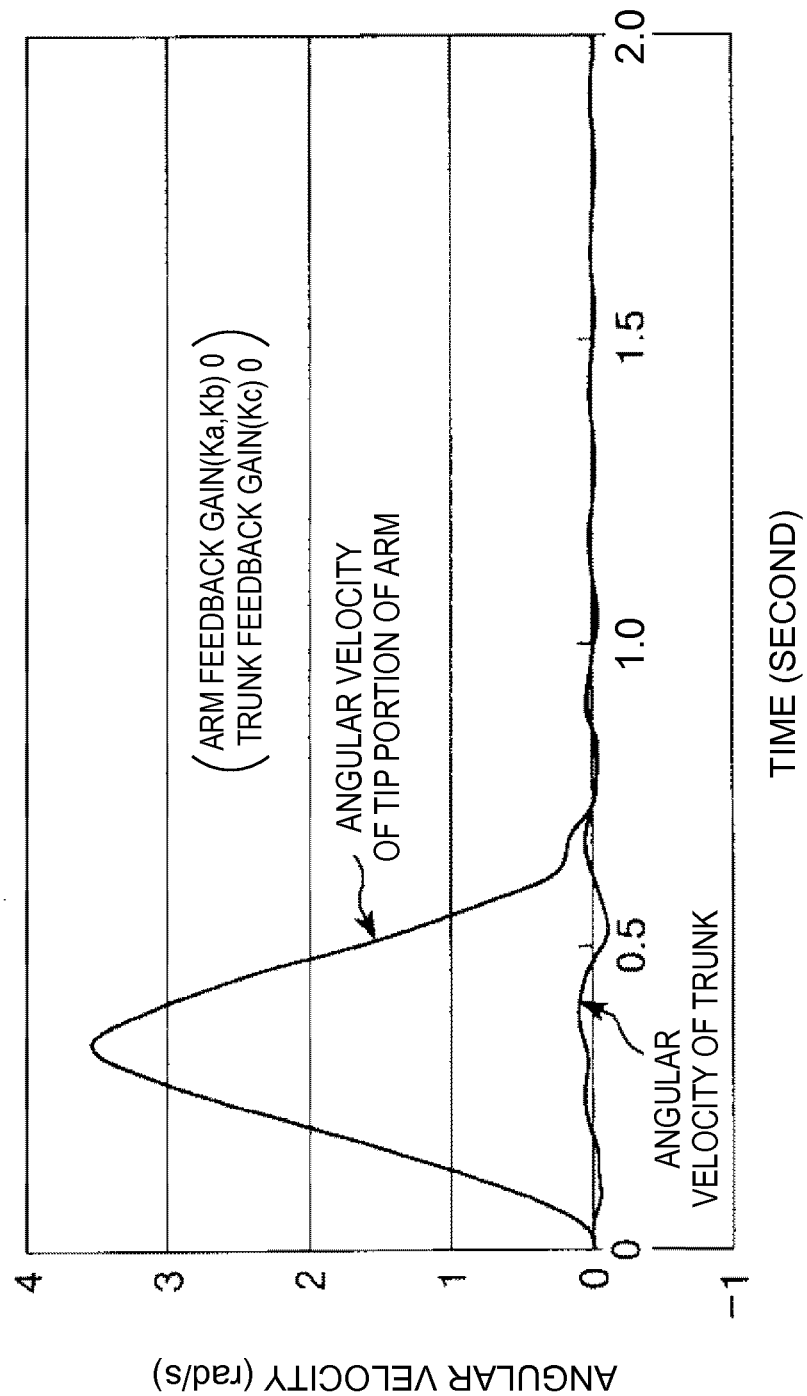
FIG. 15 is a graph illustrating the angular velocity of the tip portion of the robot arm and the angular velocity of the trunk in the robot of the robot system illustrated in FIG. 1.
Figure 16:
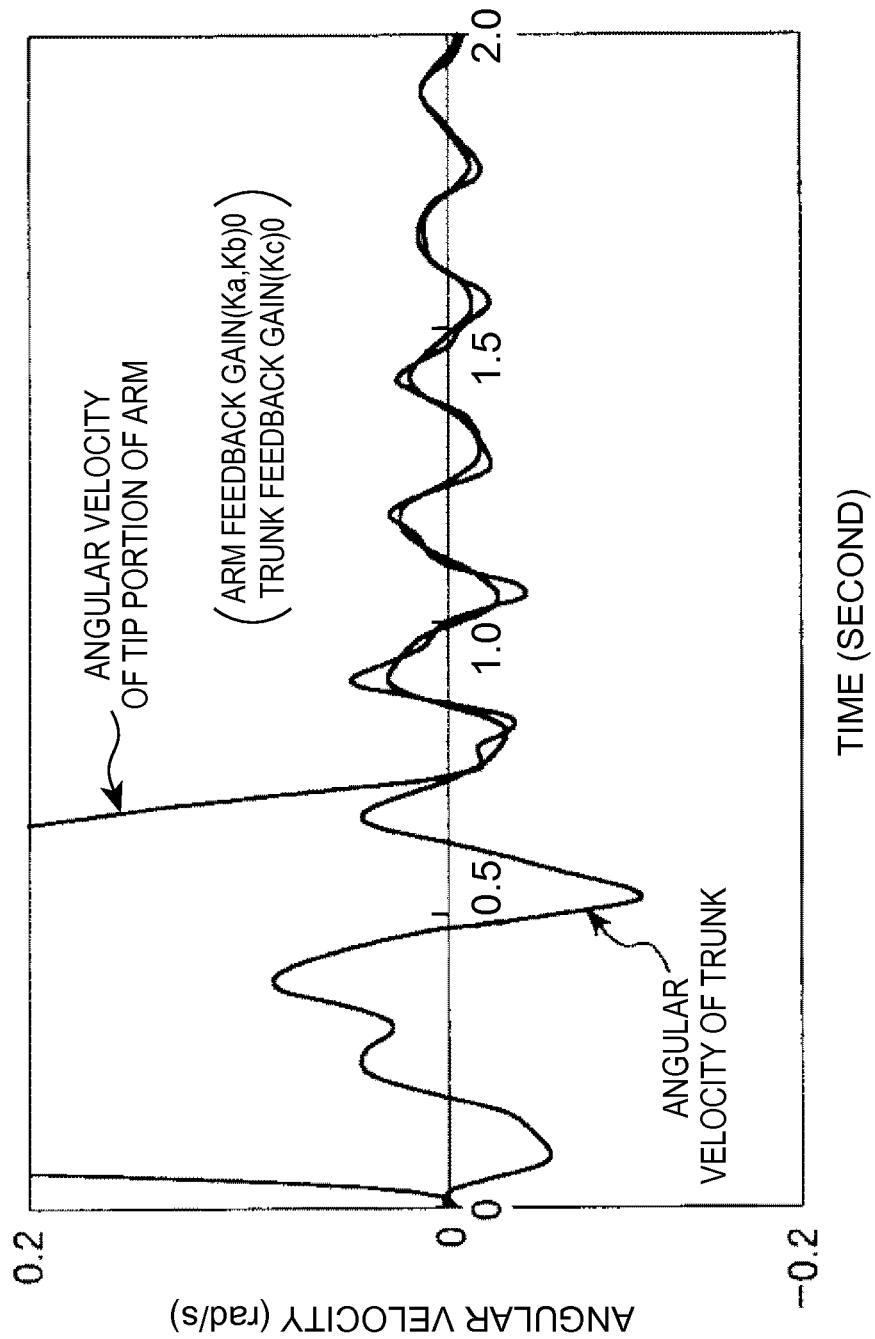
FIG. 16 is a graph illustrating the angular velocity of the tip portion of the robot arm and the angular velocity of the trunk in the robot of the robot system illustrated in FIG. 1.

Additionally, the angular velocity of the tip portion of the robot arm 230 around the rotational axis O1 and the angular velocity of the trunk 220 around the rotational axis O1 when the gains Ka and Kb are 0 and the gain Kc is 0 (comparative example) are illustrated in FIG. 15 and FIG. 16. In addition, the graph of FIG. 16 illustrates the vertical axis of the graph of FIG. 15 in an enlarged manner.

Then, B/A was measured for the respective cases.

The results are 0.34 when the gains Ka and Kb are 0 and the gain Kc is 0 (comparative example) and the results are 0.34 when the gains Ka and Kb are 0.25 and the gain Kc is 0 (comparative example), and the vibrations are very large, respectively.

In contrast, the results are 0.27 when the gains Ka and Kb are 0.25 and the gain Kc is 0.25 (the invention) and the results are 0.15 when the gains Ka and Kb are 0.25 and the gain Kc is 0.5 (the invention), and the vibrations are very small, respectively.

As described above, according to the robot system 100, the vibration of the robot arms 230 and 240 and the trunk 220 can be suppressed. By setting B/A and D/C as mentioned above, the stiffness of the trunk 220 around the rotational axis O1 becomes equivalently high. As a result, the effect of suppressing the vibration of the robot arms 230 and 240 and the trunk 220 can be enhanced.

Specifically, for example, the vibration of the trunk 220 by the reactions of the operation of the robot arms 230 and 240 can be suppressed, and the effect of suppressing the vibration can be enhanced. Accordingly, the vibration of three members including an operating robot arm, the trunk 220, and a robot arm opposite to the operating robot arm is also suppressed, and quick positioning is enabled.

Although the robot control device, the robot, and the robot system according to the invention have been described on the basis of the illustrated embodiment, the invention is not limited to this, and the configurations of the respective portions can be substituted with arbitrary configurations having the same functions. Additionally, other arbitrary structures may be added to the invention.

Additionally, in the aforementioned embodiment, angular velocity sensors are used as the inertial sensors. However, the invention is not limited to this. For example, acceleration sensors or the like may be used as the inertial sensors.

Additionally, the types of the respective position sensors are not particularly limited, and include, for example, an optical type, a magnetic type, an electromagnetic type, an electric type, or the like.

Additionally, although the movable robot has been described in the aforementioned embodiment, the robot may be fixed to the floor, ceiling, wall, or the like of a work room, with bolts or the like.

Additionally, although the number of rotational axes of the robot is fifteen in the aforementioned embodiment, the invention is not limited to this. The number of rotational axes of the robot may be one to fourteen or may be sixteen or more.

Additionally, although the number of robot arms is two in the aforementioned embodiment, the invention is not limited to this. The number of robot arms may be three or more.

The entire disclosure of Japanese Patent Application No. 2013-225387, filed Oct. 30, 2013 is expressly incorporated by reference herein.

What is claimed is:

1. A robot control device, comprising:
a trunk that is rotatable around a trunk rotational axis;
a first robot arm and a second robot arm that are provided at the trunk and are rotatable with respect to the trunk;
a first inertial sensor that is provided at the first robot arm;
a second inertial sensor that is provided at the second robot arm; and
a third inertial sensor that is provided at the trunk and that detects an angular velocity of the trunk with respect to the trunk rotational axis,
wherein, in a first operation in which the second robot arm is in a first stationary state and the first robot arm is rotated around the trunk rotational axis from the first stationary state and moved to a first target position, when a first maximum amplitude value of the angular velocity of the trunk around the trunk rotational axis before the first robot arm reaches the first target position is defined as A, and a second maximum amplitude value of the angular velocity of the trunk around the trunk rotational axis after the first robot arm has reached the first target position at a first time is defined as B, and B/A<0.27.

2. The robot control device according to claim 1, wherein the first robot arm includes:
a first link that is provided at the trunk and is rotatable around a first rotational axis;
a second link that is provided at the first link and is rotatable around a second rotational axis, which is orthogonal to the first rotational axis or parallel to an axis orthogonal to the first rotational axis;
a third link that is provided at the second link and is rotatable around a third rotational axis, which is orthogonal to the second rotational axis or parallel to an axis orthogonal to the second rotational axis; and
a fourth link that is provided at the third link and is rotatable around a fourth rotational axis, which is orthogonal to the third rotational axis or parallel to an axis orthogonal to the third rotational axis,
wherein, in the first operation in which the first robot arm is moved from the first stationary state to the first target position, an angle formed between a central axis extending in a longitudinal direction of the third link of the first robot arm and a central axis extending in a longitudinal direction of the fourth link is 90°, and the third link of the first robot arm is rotated by 90°.

3. The robot control device according to claim 1, wherein, in a second operation in which the first robot arm is in a second stationary state and the second robot arm is rotated around the trunk rotational axis from the second stationary state and moved to a second target position, when a third maximum amplitude value of the angular velocity of the trunk around the trunk rotational axis before the second robot arm reaches the second target position is defined as C, and a fourth maximum amplitude value of the angular velocity of the trunk around the trunk rotational axis after the second robot arm has reached the second target position at a first time is defined as D, and D/C<0.27.

4. The robot control device according to claim 3, wherein the second robot arm includes:
a first link that is provided at the trunk and is rotatable around a first rotational axis;
a second link that is provided at the first link and is rotatable around a second rotational axis, which is orthogonal to the first rotational axis or parallel to an axis orthogonal to the first rotational axis;
a third link that is provided at the second link and is rotatable around a third rotational axis, which is orthogonal to the second rotational axis or parallel to an axis orthogonal to the second rotational axis; and
a fourth link that is provided at the third link and is rotatable around a fourth rotational axis, which is orthogonal to the third rotational axis or parallel to an axis orthogonal to the third rotational axis,
wherein, in the second operation in which the second robot arm is moved from the second stationary state to the second target position, an angle formed between a central axis extending in a longitudinal direction of the third link of the second robot arm and a central axis extending in a longitudinal direction of the fourth link is 90°, and the third link of the second robot arm is rotated by 90°.

5. The robot control device according to claim 1, further comprising:
a controller that controls actuations of the trunk, the first robot arm, and the second robot arm while suppressing vibrations thereof based on detection results of the first inertial sensor, the second inertial sensor, and the third inertial sensor.

6. The robot control device according to claim 5, wherein the controller
obtains a first correction component based on the detection results of the first inertial sensor and the third inertial sensor, and feeds back the first correction component to suppress the vibration of the first robot arm,
obtains a second correction component based on the detection results of the second inertial sensor and the third inertial sensor, and feeds back the second correction component to suppress the vibration of the second robot arm, and
obtains a third correction component based on the detection result of the third inertial sensor and feeds back the third correction component to suppress the vibration of the trunk, and
wherein a feedback gain of the third correction component is greater than a feedback gain of the first correction component.

7. The robot control device according to claim 6, wherein the feedback gain of the third correction component is greater than as feedback gain of the second correction component.

8. The robot control device according to claim 6, wherein the controller adjusts the feedback gain of the third correction component in accordance with a posture of at least one of the first robot arm and the second robot arm.

9. The robot control device according to claim 8, wherein the robot is in a first posture and in a second posture, when the robot is in the second posture, an inertial moment of the robot around the trunk rotational axis is greater than that of the first posture, the controller makes the feedback gain of the third correction component in the second posture greater than that in the first posture.

10. The robot control device according to claim 1, wherein the angular velocity of the trunk around the trunk rotational axis is obtained based on the detection result of the third inertial sensor.

11. A robot comprising:
a trunk that is rotatable around a trunk rotational axis;
a first robot arm and a second robot arm that are provided at the trunk and are rotatable with respect to the trunk;

a first inertial sensor that is provided at the first robot arm;
a second inertial sensor that is provided at the second robot arm; and
a third inertial sensor that is provided at the trunk and that detects an angular velocity of the trunk with respect to the trunk rotational axis,
wherein, in a first operation in which the second robot arm is in a first stationary state and the first robot arm is rotated around the trunk rotational axis from the first stationary state and moved to a first target position, when a first maximum amplitude value of the angular velocity of the trunk around the trunk rotational axis before the first robot arm reaches the first target position is defined as A, and a second maximum amplitude value of the angular velocity of the trunk around the trunk rotational axis after the first robot arm has reached the first target position at a first time is defined as B, and B/A<0.27.

12. The robot according to claim 11,
wherein, in a second operation in which the first robot arm is in a second stationary state and the second robot arm is rotated around the trunk rotational axis from the second stationary state and moved to a second target position, when a third maximum amplitude value of the angular velocity of the trunk around the trunk rotational axis before the second robot arm reaches the second target position is defined as C, and a fourth maximum amplitude value of the angular velocity of the trunk around the trunk rotational axis after the second robot arm has reached the second target position at as first time is defined as D, and D/C<<0.27.

13. A robot system comprising:
a robot including:
a trunk that is rotatable around a trunk rotational axis;
a first robot arm and a second robot arm that are provided at the trunk and are rotatable with respect to the trunk;
a first inertial sensor that is provided at the first robot arm;
a second inertial sensor that is provided at the second robot arm; and
a third inertial sensor that is provided at the trunk and that detects an angular velocity of the trunk with respect to the trunk rotational axis, and
a robot control device that controls the robot,
wherein, in a first operation in which the second robot arm is in a first stationary state and the first robot arm is rotated around the trunk rotational axis from the first stationary state and moved to a first target position, when a first maximum amplitude value of the angular velocity of the trunk around the trunk rotational axis before the first robot arm reaches the first target position is defined as A, and a second maximum amplitude value of the angular velocity of the trunk around the trunk rotational axis after the first robot arm has reached the first target position at a first time is defined as B, and B/A<0.27.

14. The robot system according to claim 13,
wherein, in a second operation in which the first robot arm is in a second stationary state and the second robot arm is rotated around the trunk rotational axis from the second stationary state and moved to a second target position, when a third maximum amplitude value of the angular velocity of the trunk around the trunk rotational axis before the second robot arm reaches the second target position is defined as C, and a fourth maximum amplitude value of the angular velocity of the trunk around the trunk rotational axis after the second robot arm has reached the second target position at a first time is defined as D, and D/C<0.27.

* * * * *